US011909112B2

(12) United States Patent
Wu et al.

(10) Patent No.: US 11,909,112 B2
(45) Date of Patent: Feb. 20, 2024

(54) SIDEBAND-FREE SPACE-TIME-CODING METASURFACE ANTENNAS

(71) Applicant: City University of Hong Kong, Hong Kong (HK)

(72) Inventors: Gengbo Wu, Hong Kong (HK); Junyan Dai, Nanjing (CN); Chi Hou Chan, Hong Kong (HK)

(73) Assignee: City University of Hong Kong, Hong Kong (HK)

( * ) Notice: Subject to any disclaimer, the term of this patent is extended or adjusted under 35 U.S.C. 154(b) by 111 days.

(21) Appl. No.: 17/848,424

(22) Filed: Jun. 24, 2022

(65) Prior Publication Data

US 2023/0420861 A1 Dec. 28, 2023

(51) Int. Cl.
*H01Q 15/00* (2006.01)
*H01Q 1/22* (2006.01)

(52) U.S. Cl.
CPC ....... *H01Q 15/0086* (2013.01); *H01Q 1/2283* (2013.01); *H01Q 15/006* (2013.01)

(58) Field of Classification Search
CPC ............. H01Q 15/006; H01Q 15/0086; H01Q 1/2283; H01Q 1/38; H01Q 13/10; H01Q 13/20; H01Q 19/108; H01Q 19/13; H01Q 21/0043; H01Q 21/005
See application file for complete search history.

(56) References Cited

U.S. PATENT DOCUMENTS

| | | | |
|---|---|---|---|
| 6,456,251 B1 | 9/2002 | Rao | |
| 7,071,888 B2 | 7/2006 | Sievenpiper | |
| 9,268,016 B2 | 2/2016 | Smith et al. | |
| 9,405,136 B2 | 8/2016 | Alu et al. | |
| 9,685,709 B2 | 6/2017 | Sabbadini et al. | |
| 10,014,585 B2 | 7/2018 | Patron et al. | |
| 10,340,599 B2 * | 7/2019 | Tayfeh Aligodarz | H01Q 9/0485 |
| 10,418,721 B2 | 9/2019 | Chattopadhyay et al. | |
| 11,537,025 B2 * | 12/2022 | Ni | G02F 1/2955 |
| 2017/0069967 A1 * | 3/2017 | Shrekenhamer | H01Q 3/26 |
| 2019/0326670 A1 * | 10/2019 | Pelletti | H01Q 3/36 |
| 2020/0328515 A1 * | 10/2020 | Sazegar | H01Q 15/0086 |
| 2021/0296778 A1 * | 9/2021 | Varel | H01Q 21/0056 |
| 2022/0173520 A1 * | 6/2022 | Manholm | H01Q 15/0086 |
| 2022/0209411 A1 * | 6/2022 | Che | H01Q 1/523 |
| 2022/0328965 A1 * | 10/2022 | Chalabi | H01Q 15/0086 |
| 2022/0330259 A1 * | 10/2022 | Jamieson | H04B 17/391 |

* cited by examiner

*Primary Examiner* — Jason M Crawford
(74) *Attorney, Agent, or Firm* — Idea Intellectual Limited; Margaret A. Burke; Sam T. Yip

(57) ABSTRACT

A self-filtering, space-time coding, waveguide-driven metasurface antenna includes at least first and second metal layers, and first dielectric layer between the first and second metal layers. A series of vias is formed in the first dielectric layer. A substrate integrated waveguide (SIW) is formed from the first and second metal layers and from the metal vias in the first dielectric layer. A series of meta-atoms is formed in the first metal layer, each meta-atom including a slot cooperating with two switching elements for switching the meta-atom between an on and off state. Each meta-atom behaves as a magnetic dipole antenna element that radiates electromagnetic waves into free space. In this manner, the propagating guided waves inside the substrate integrated waveguide are converted and molded into arbitrary selected out-of-plane free-space waves in both a frequency domain and a momentum domain.

10 Claims, 21 Drawing Sheets

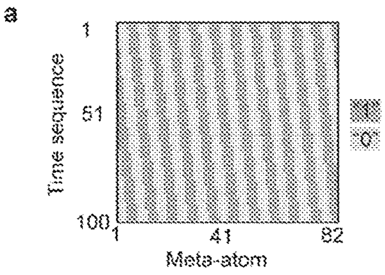
FIG. 3a
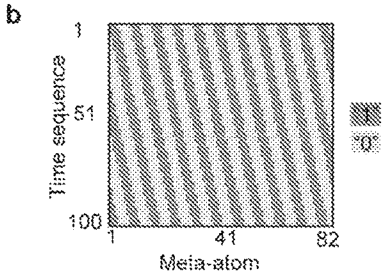
FIG. 3b
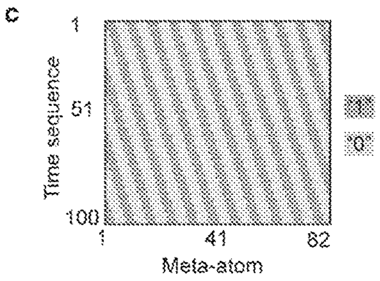
FIG. 3c
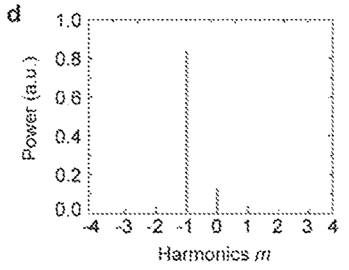
FIG. 3d
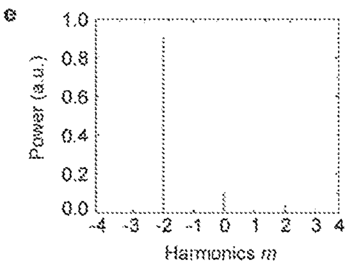
FIG. 3e
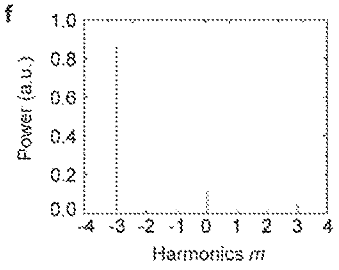
FIG. 3f
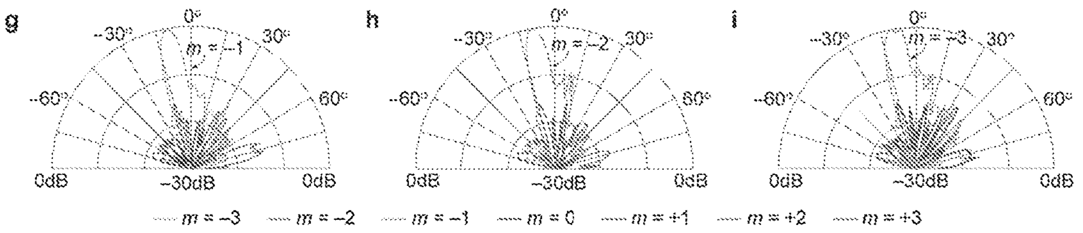
FIG. 3g
FIG. 3h
FIG. 3i a b c

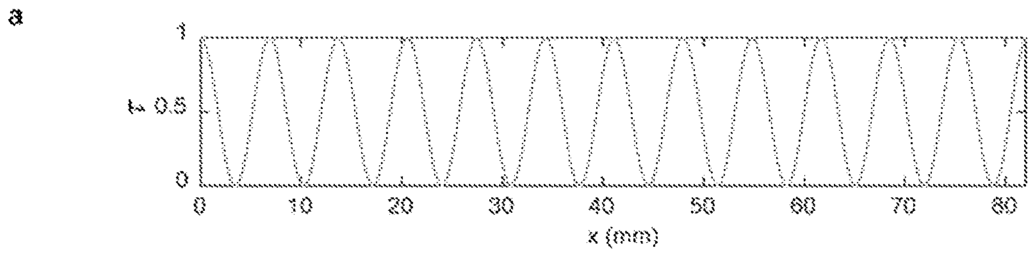
FIG. 14a
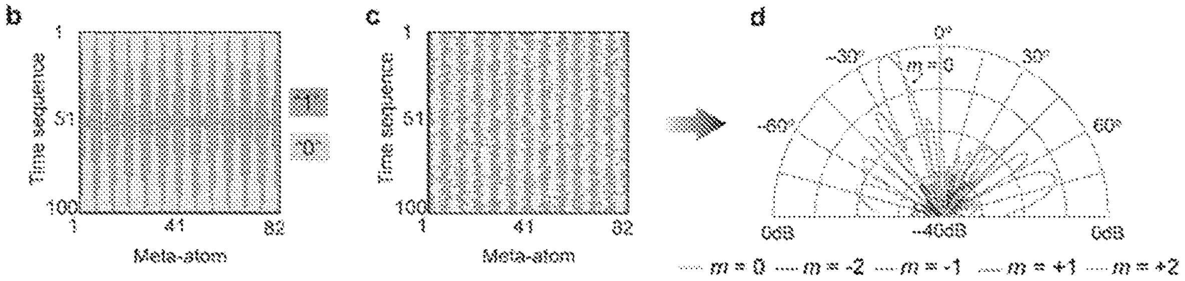
FIG. 14b
FIG. 14c
FIG. 14d

SIDEBAND-FREE SPACE-TIME-CODING METASURFACE ANTENNAS

FIELD OF THE INVENTION

The present inventions relate to metasurface antennas, in general and, more particularly, to sideband-free space-time-coding metasurface antennas.

BACKGROUND

In the past decades, metamaterials have witnessed a successful development due to their unique and extraordinary electromagnetic (EM) properties not found in nature. Metamaterials are artificial materials engineered to have one or more properties that are not naturally occurring. In particular, metamaterials used in antennas may include periodic-arranged subwavelength structures structured to achieve macroscopic EM properties that lead to diverse phenomena and novel devices. Metasurfaces, the two-dimensional (2D) equivalents of metamaterials, have superior distinctions compared to their 3D counterparts, such as low insertion loss, easy fabrication, and potential conformability. Metasurfaces support the manipulation of electromagnetics (EM) waves' properties, including amplitude, phase, polarization, as well as their dynamic control by integrating functional materials. In particular, spatial gradient metasurfaces provide a powerful approach to control the momentum of EM waves, enabling a wide variety of intriguing functions, such as abnormal deflection, orbital angular momentum generation, holography, cloaking, to name just a few. Moreover, by loading tunable components into metasurfaces, the wave-front of EM waves can be switched whenever needed.

Recently, time-varying metasurfaces incorporated with space modulation, i.e., spatiotemporally modulated metasurfaces (STMMs), have attracted tremendous interest in science and engineering communities. STMMs are characterized by their one or more spatially and temporally variant parameters, such as the reflection/transmission phase, amplitude, surface impedance, and conductivity of the constitutive material. Compared to conventional gradient metasurfaces, STMMs introduce an additional dimension, time, into metasurface design, enabling intriguing physical phenomena and a new level of EM wave manipulation in the momentum and frequency spaces. STMMs can be generally divided into three categories according to whether their excitation and output are free-space or guided waves.

The first type of STMMs is used to control guided waves inside waveguides. Waveguide-based STMMs can break time-reversal symmetry and Lorentz reciprocity through cascading two standing-wave modulators with a relative phase shift, or via the unidirectional-propagating permittivity/conductivity of the constructive medium. The nonreciprocal STMMs can behave as optical isolators or circulators, potentially for on-chip integrated photonics. In addition, STMMs allow the control of the spectra of guided waves by forming photonic gauge potentials, leading to diverse, intriguing phenomena, such as frequency comb generation, negative refraction, perfect focusing, and Bloch oscillations in the synthetic frequency dimensions. In these cases, the input and output are both guided modes propagating inside waveguides.

The second type of STMMs is excited by external free-space waves to achieve novel physical phenomena and interesting applications, including overcoming Lorentz reciprocity constraints, Doppler cloaks, harmonic generation, frequency conversion and direct information modulation. For these situations, both the input and output are free-space waves, making them difficult for further on-chip integration. To date, significant research efforts have been made to realize free-space-only and guided-wave-only STMMs, which require either external light excitation or deal with guided waves inside waveguide only.

In contrast, there is a paucity of research exploring the third type of STMMs that bridge the gap between the free-space and guided modes. The third type of metasurface is herein called "metasurface antenna" to distinguish it from the first two types by emphasizing its unique property that links guided waves in transmission lines and free space waves. So far, only the breakdown of Lorentz reciprocity has been investigated, while many other wave spatiotemporal manipulations have yet to be explored.

There are large number of significant applications from microwave wireless communications to optical light fidelity (Li-Fi) and light detection and ranging (LiDAR) systems. These systems demand advanced interfaces that can couple guided waves from the in-plane sources into free space and on-demand manipulate the extracted free-space waves. Phased arrays are well explored at microwave frequencies to implement beamforming and steering, but they are extremely costly and power-hungry. Edge couplers and surface gratings used for optical on-chip guided-to-space coupling incur very limited functionalities over light control. The advent of metasurfaces, enabling EM-matter interactions within an ultra-thin artificial surface, provides a paradigm shift for bridging the gap between the waveguide and free space. However, most metasurface antennas have space-only modulation without exploiting the time dimension. The study of spatiotemporally modulated metasurface antennas has the potential to revolutionize fundamental and applied EMs through effective coupling and full molding of the guided mode into desired free-space waves simultaneously in time and space.

Sideband pollution has become the fundamental bottleneck that hinders the broad application of STMMs. The periodic temporal modulation in STMMs would produce unwanted harmonic radiations, severely interfering with the useful signals. Thus, there is a need in the art for sideband elimination in metasurface antennas. The present invention addresses this need.

SUMMARY OF THE INVENTION

The present invention provides a novel and unique "self-filtering" phenomenon for waveguide-driven metasurface antennas. The developed space-time-coding (STC) metasurface antennas can achieve versatile and complex guided to free-space functions in both the spectral and spatial domains and be free of sideband pollution. Moreover, theoretically predictions and experiments demonstrate that using a 1-bit coding scheme—the simplest digital version of metasurfaces—can achieve full control of frequency and momentum contents of EM waves that typically require continuous or multi-bit spatiotemporal modulations for conventional free-space-only STMMs. The STC metasurface antennas' frequency and space manipulation flexibility is demonstrated by high-efficiency frequency conversion, fundamental-frequency continuous beam scanning, and multi-harmonic independent controls, all using a 1-bit STC scheme. The inventive STC metasurface antenna does not simply replace the free-space excitation in conventional STMMs by the guided-wave feeding, but instead possesses unique features, including an extremely simplified coding arrangement (1-bit), a self-filtering property, and potential on-chip integration, etc. Such appealing characteristics make the introduced STC metasurface antenna go beyond the existing technology of free-space-only/waveguide-only STMMs, and find applications in wireless communication, cognitive radar, and integrated photonics.

In a first aspect, the present invention provides a self-filtering, space-time coding, waveguide-driven metasurface antenna that includes at least first and second metal layers, with a first dielectric layer interposed between the first and second metal layers. A series of vias is formed in the dielectric layer. A substrate integrated waveguide (SIW) is formed from the first and second metal layers and from the metal vias in the first dielectric layer. A series of meta-atoms is formed in the first metal layer, each meta-atom including a slot cooperating with two switching elements for switching the meta-atom between an on and off state. Each meta-atom behaves as a magnetic dipole antenna element that radiates electromagnetic waves into free space. In this manner, the propagating guided waves inside the substrate integrated waveguide are converted and molded into arbitrary selected out-of-plane free-space waves in both a frequency domain and a momentum domain.

In another aspect, the meta-atoms are formed in first and second rows.

In another aspect, the period for the first row of meta-atoms is offset from a period for the second row of meta-atoms.

In another aspect, the device includes control lines.

In another aspect, the switching elements are PIN diodes.

In another aspect, the invention includes a controller to switch the switching elements between a coupling and a non-coupling state in a predetermined sequence to create the arbitrary free-space waves.

In another aspect, the controller is an FPGA.

In another aspect, unwanted higher-order harmonics cannot fulfill phase-matching conditions and are prohibited inside the SIW.

In another aspect, the radiating state of each meta-atom is configured to be independently controlled by switching the switching elements of each meta-atom in a predetermined coding sequence.

In another aspect, a processor supplies the predetermined coding sequence.

BRIEF DESCRIPTION OF THE DRAWINGS

FIG. 2*b* is a dispersion diagram for frequency conversion. The STC modulation introduces a tangential momentum $k_m$ to the target translated harmonic, pushing it into the light cone. Other undesired higher-order harmonics are in the forbidden regions and filtered out by the phase-matching conditions. FIGS. 2*c*, 2*d*, and 2*e* are "0/1" digital STC matrices for +1 harmonic frequency translations with output angles of −50°, −10°, and +30°, respectively. FIGS. 2*f*, 2*g*, and 2*h* are the corresponding measured power distributions at different harmonics. FIGS. 2*i*, 2*j*, and 2*k* are the corresponding theoretically calculated and measured radiation patterns at the +1 harmonic frequency.

FIGS. 3*a*-3*i* depict arbitrary harmonic frequency conversion. FIGS. 3*a*, 3*b*, and 3*c* show the required "0/1" digital STC matrices for translating the guided waves at $\omega_0$ into free-space waves at −1, −2 and −3 harmonic frequencies, respectively. FIGS. 3*d*, 3*e*, and 3*f* are the corresponding measured power distributions at different harmonics for m=−1, −2, −3 harmonic frequency conversions, respectively. FIGS. 3*g*, 3*h*, and 3*i* are the corresponding measured radiation patterns at different harmonic frequencies.

FIG. 4*a* is a schematic of the STC metasurface antenna for fundamental-frequency beam scanning. The output angle of the radiation beam at the fundamental frequency can be continuously scanned from the backward end-fire toward forward end-fire according to the applied "0/1" STC matrix. All the undesired higher-order harmonics are highly suppressed. FIG. 4*b* is a Brillouin diagram for the STC metasurface antenna for full-space beam steering at the fundamental frequency. The fast-wave n=−1 space harmonic is fast and radiated, whose output angle can be on-demand controlled by varying the spatial modulation period Λ. FIG. 4*c* is the equivalent amplitude distributions or normalized duty cycles along the metasurface aperture for output angles at −20°, +20°, +40°, and +50°. FIG. 4*d* is the theoretically calculated (dashed line) and measured (dots) output angles versus the spatial modulation period Λ. FIGS. 4*e*, 4*f*, 4*g*, and 4*h* are "0/1" STC digital matrices for output angles at −20°, +20°, +40°, and +50°, respectively. FIGS. 4*i*, 4*j*, 4*k*, and 4*l* are the corresponding measured radiation patterns at different harmonic frequencies.

FIG. 5*a* is a schematic of the STC metasurface antenna for multi-harmonic independent control. The input guided waves at the frequency $\omega_0$ are translated into free-space waves at multiplex target harmonic frequencies, whose output angles can be dynamically and independently controlled by the applied digital "0/1" STC matrix. Meta-atoms in different colors are responsible for different harmonics radiations in the corresponding colors. Every three neighboring meta-atoms form a super unit cell for multi-harmonic radiation. FIG. 5*b* shows the design process of the "0/1" STC matrix for multi-harmonic independent control. The continuous STC matrices for m=−1, +2, +3 separate harmonic conversions are alternately sampled and subsequently combined to form the final STC matrix. FIG. 5*c* is the dispersion diagram for multi-harmonic independent control. The STC modulation introduces different tangential momentums to the target harmonics to push them into the light cone for radiation. FIGS. 5*d*, 5*e*, and 5*f* are measured radiation patterns when the output beams of the m=−1, +2, +3 harmonics are scanned to (0°, +30°, +15°), (0°, 0°, 0°), and (0°, −15°, +15°), respectively.

FIG. 6*a* is an over-view of the layer structure; FIG. 6*b* is the configuration of the top layer; FIG. 6*c* is the configuration of an SIW-based meta-atom; PIN diodes, controlled by a controller such as an FPGA, are incorporated into each meta-atom to switch the element between the coupling and non-coupling states. FIG. 6*d* shows simulated radiation patterns of the meta-atom in coupling ("1") and non-coupling ("0") states. FIG. 6*e* depicts a measurement configuration of the STC metasurface antenna in a microwave anechoic chamber.

FIG. 7*a* is a top view and FIG. 7*b* is a bottom view.

FIG. 8*a* is the equivalent circuit of the PIN diodes in ON and OFF states in the CST full-wave simulation; FIG. 8*b* is the simulated amplitude of $S_{11}$; FIG. 8*c* is the simulated amplitude of $S_{21}$; FIG. 8*d* is the simulated phase of $S_{21}$.

FIG. 9*a* is a top view; FIG. 9*b* is a back view; FIG. 9*c* is an entire STC metasurface assembled with an FPGA control board.

FIG. 11*a* is for the output angle of the +1 harmonic frequency $\theta_r=-50°$. FIG. 11*b* is for $\theta_r=-10°$. FIG. 11*c* is for $\theta_r=30°$.

FIG. 13*a* The calculated normalized duty cycle along the metasurface aperture is calculated by equation (14). FIG. 13*b* is the corresponding synthesized STC matrix sinusoidal duty cycle distribution. FIG. 13*c* is the revised STC matrix after randomization. FIGS. 13*d*, 13*e* are the corresponding calculated radiation patterns at different harmonics using the STC matrices in b and c, respectively.

FIGS. 14*a*-14*l* depict the design process for fundamental-frequency beam scanning. FIGS. 14*a*, 14*e*, 14*i* are the calculated normalized duty cycle along the length of the metasurface antenna when the output angles are −20°, +40°, and +50°, respectively. FIGS. 14*b*, 14*f*, 14*j* are the corresponding synthesized STC matrices using the sinusoidal duty cycle distribution. FIGS. 14*c*, 14*g*, and 14*k* are the corresponding revised STC matrices after randomization. FIGS. 14*d*, 14*h*, and 14*l* are the corresponding calculated radiation patterns at different harmonics using the STC matrices in 14*c*, 14*g* and 14*k*, respectively.

FIG. 15*a* shows the measured normalized scattering patterns as the output beam scans from −60° to 60° with an increment of 20°. FIG. 15*b* is the measured realized gain as a function of the output angle at the fundamental frequency.

FIGS. 16*a*-16*e* are the measured radiation patterns at the fundamental frequency as the input frequencies are 25.5, 26.0, 26.5, 27.0, and 27.5 GHz, respectively.

FIG. 17*a* is the STC matrix design process when the output beams of the m=−1, +2, +3 harmonics are scanned to (0°, +30°, +15°). The corresponding measured radiation patterns are shown in FIG. 5*d*. FIG. 17*b* shows the STC matrix design process when the output beams of the m=−1, +2, +3 harmonics are scanned to (0°, 0°, 0°). The corresponding measured radiation patterns are shown in FIG. 5*e*.

DETAILED DESCRIPTION

Figure 6A:
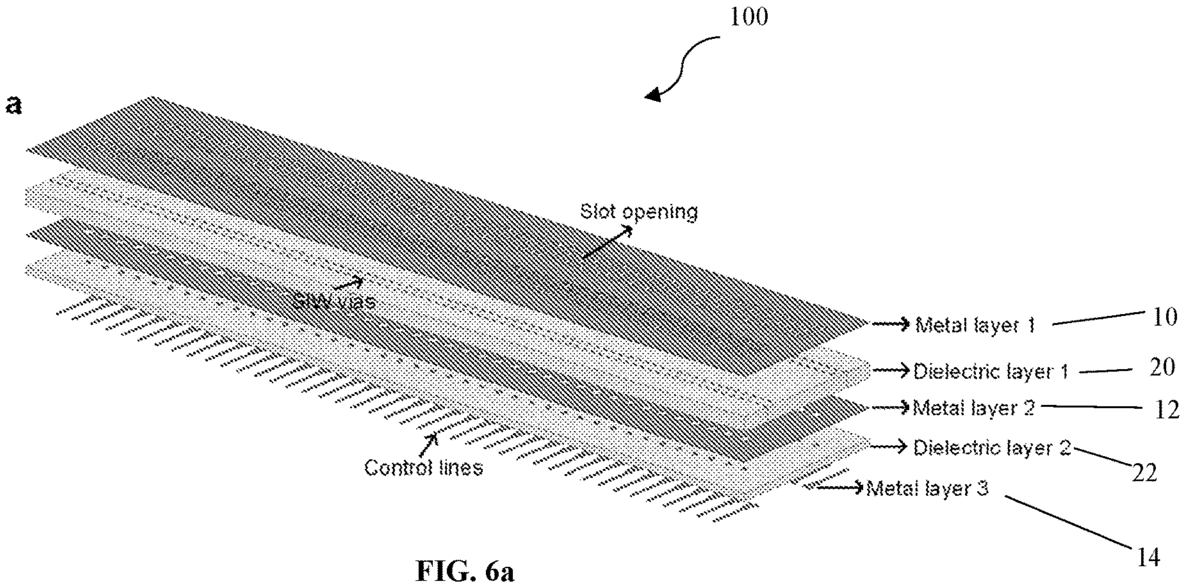
FIGS. 6*a*-6*e* show an embodiment of an STC metasurface antenna according to an embodiment.
Figure 6B:
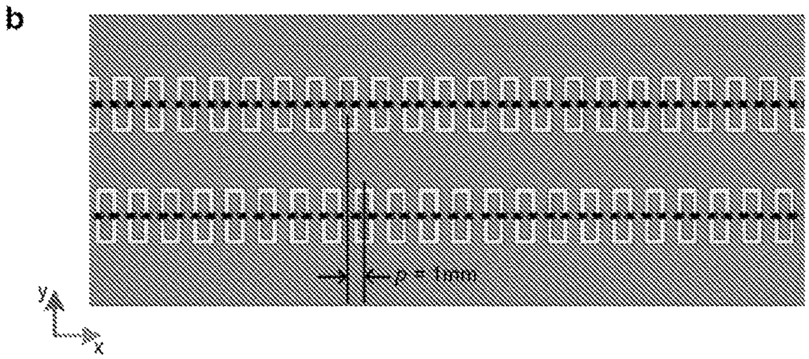
Figure 7A:
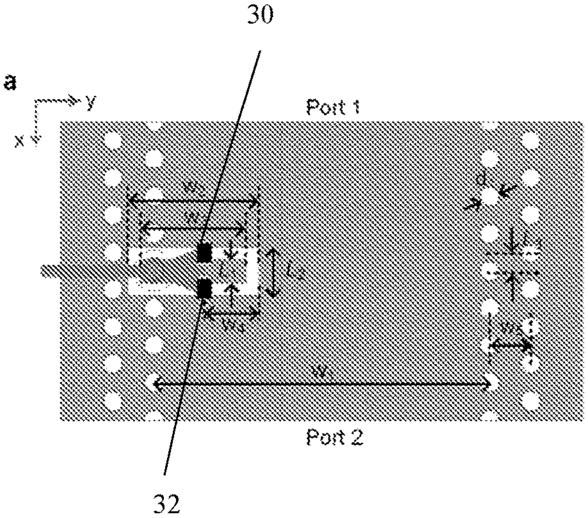
FIGS. 7*a*-7*b* depict further configurations of the meta-atom.

Turning to the drawings in detail, FIG. 6*a* depicts a configuration of a metasurface antenna according to an embodiment. FIG. 6*a* shows a waveguide-driven metasurface antenna 100 based on a substrate integrated waveguide (SIW) transmission line. The metasurface antenna consists of three metal layers 10, 12, and 14 and two dielectric layers 20 and 22 bonded by a Rogers 4450F film (not shown). In an embodiment, the top and bottom dielectric layers may be 1.52- and 0.76 mm-thick Taconic TLY substrates with a relative dielectric constant $\varepsilon_r=2.2$ and a loss tangent tan $\delta=0.0009$, respectively. Other substrates and thicknesses may be used based on the desired dielectric properties. The SIW waveguide uses the top and middle metal layers 10, 12, as well as the two rows of metallic vias 16 to confine EM waves within the first substrate 20. A rectangular opening slot 18 is etched on the top metal layer 10 to couple waves into free space. The rectangular slot is an etched rectangular line whose periphery surrounds a metal central portion (best seen in FIG. 7*a*). Each rectangular slot includes two switching elements 30, 32, as seen in FIGS. 6*b* and 7*a*, that are used to control the activity of the slot 18. Each slot 18 along with switching elements 30, 32, create a "meta-atom" 26 that behaves as a magnetic dipole antenna element that radiates electromagnetic waves into free space; in this manner, propagating guided waves inside the substrate integrated waveguide are converted and molded into arbitrary selected out-of-plane free-space waves in both a frequency domain and a momentum domain.

The control lines 19 with open-ended radial stubs for RF chocking are located at the bottom metal layer 14. In the embodiment of FIG. 6*b*, the period for one row of the meta-atom is 2 mm along the x-axis, and the other slot array is offset by 1 mm along the x-axis. As such, two interlaced slot arrays result in an equivalent deep subwavelength element period of p=1 mm along the x-axis, corresponding to $0.09\lambda_0$ ($\lambda_0$ is the free-space wavelength at 27 GHz), as shown in FIG. 6*b*. The staggered structure can effectively reduce the spatial sampling of the digital metasurface by decreasing the period of the meta-atom to half of the original one. This is particularly useful for the multi-harmonic independent control.

In the embodiment of FIGS. 6*a*-6*b*, there are 82 meta-atoms with 164 PIN diodes. Two PIN diodes in each meta-atom share the same ON and OFF states. Additionally, all the PIN diodes share the same negative electrode through the top metal layer of the SIW. At the same time, the 82-way voltages drive the positive electrode through the shorted vias passing from the top substrate down to the bottom one connected to the FPGA.

Figure 7B:
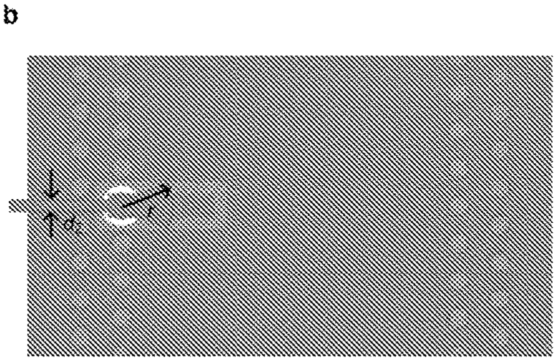

The configurations of the meta-atom are illustrated in the embodiment of FIGS. 7*a*-7*b*. The width of the SIW w1 between sets of vias 16 is selected to be 9 mm to support a fundamental TE10 mode while suppressing higher-order guided modes. The parameters of the meta-atom 26 (length, width, diode spacing width within the meta-atom) are summarized in Table 1, below. The meta-atom 26 is modeled and simulated in a CST Studio Suite numerical simulator. Note that the numbers of Table 1 are exemplary and that other values may be selected depending on the desired wavelength range of operation of the antenna.

FIGS. 8*a*-8*d* show the simulated scattering parameters of the meta-atom. From FIG. 8*b* it is observed that the |S11| are smaller than −25 dB as PIN diodes are in the ON and OFF states in the frequency range from 26 to 28 GHz. The |S21| is larger than −0.07 dB as the meta-atom is in the coupling state (PIN diodes are OFF). The |S21| is −0.04 dB in the non-coupling state, which is caused by the ohmic loss of the PIN diodes. The simulated results reveal that only a small portion of the energy can be leaked into free space when the meta-atom is in the coupling state. As such, the subsequent elements can also be excited properly. The simulated transmission phase variations are −0.64° and 2.2° as the meta-atom in the coupling and non-coupling states compared to an SIW without PIN diodes, respectively. These results indicate that the ON-OFF switch of the slot opening on the top of the SIW has negligible perturbation on the propagating phase of the guided waves inside the waveguide. Therefore, the perturbation effects on the reference guided waves due to the ON-OFF switching of the PIN diodes are not considered in the theoretical analysis model discussed below.

TABLE 1

Dimensions of the meta-atom (Unit: mm)

| Para. | $w_1$ | $w_2$ | $w_3$ | $w_4$ | $w_5$ | $L_1$ | $L_2$ |
|---|---|---|---|---|---|---|---|
| Value | 9 | 3.5 | 2.84 | 1.25 | 1.1 | 0.64 | 1.3 |

| Para. | $L_3$ | $d_1$ | $d_2$ | r |
|---|---|---|---|---|
| Value | 0.5 | 0.5 | 0.3 | 2.15 |

Figure 1:
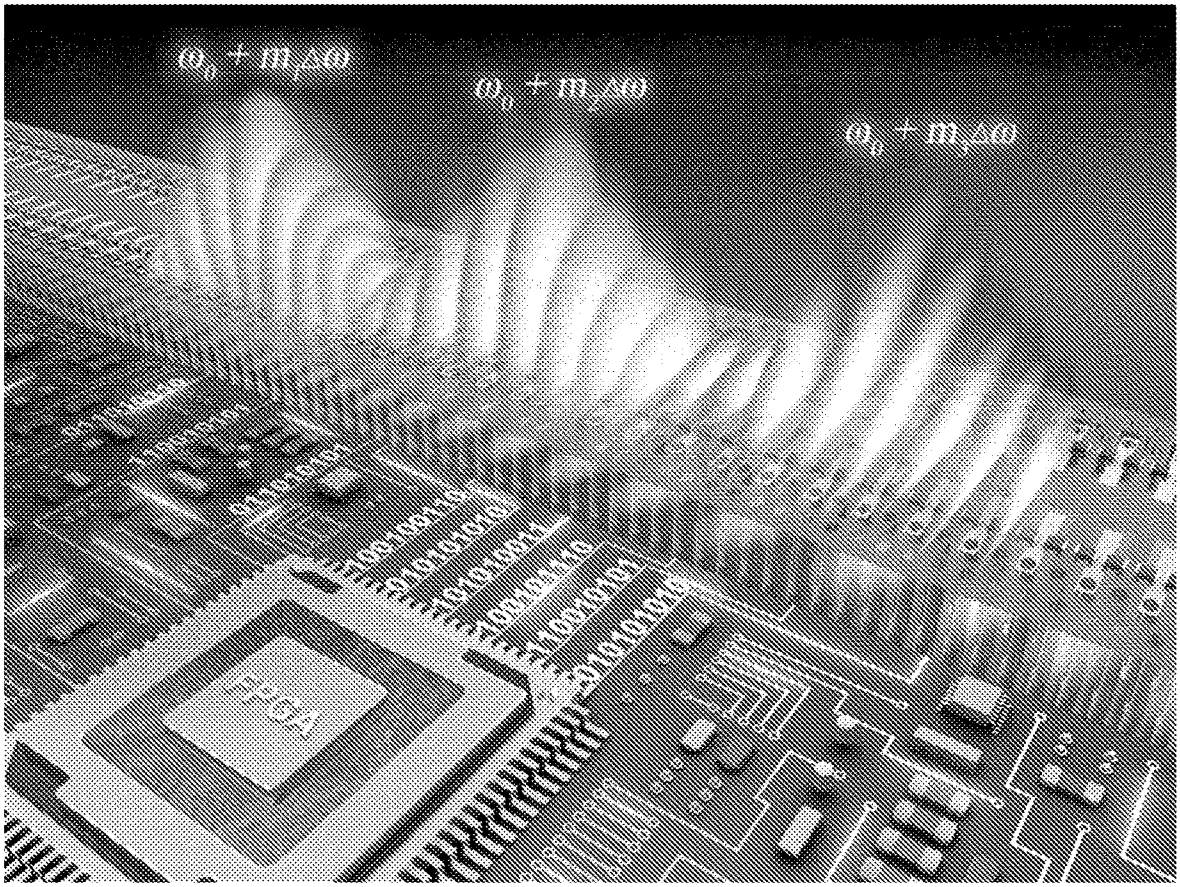
FIG. 1 is a conceptual illustration of a space-time coding (STC) metasurface antenna illustrating that the propagating guided waves inside the waveguide can be converted and molded into any desired out-of-plane free-space waves in both frequency and momentum domains. PIN diodes are incorporated into each meta-atom of the antenna to switch the element between the coupling ("1") and non-coupling ("0") states. The excitation states of the meta-atoms are periodically switched according to the applied 1-bit digital "0/1" STC matrix. The guided mode is converted into free-space modes at three different harmonic frequencies, whose radiation beams can be independently and precisely controlled.

A conceptual illustration of the waveguide-driven STC metasurface antenna of the present invention comprising a 1D array of meta-atoms is illustrated in FIG. 1. The propagating guided waves inside the waveguide can be extracted and molded into desired out-of-plane free-space waves in both the spatial and frequency domains. Positive-intrinsic-negative (PIN) diodes are utilized as the active components embedded into each meta-atom to independently and periodically switch the element between the coupling and non-coupling states. This corresponds to a 1-bit STC digital scheme, in which "1" and "0" present radiating and non-radiating states of the unit cell, respectively. The PIN diodes are controlled by a controller which, in one embodiment, may be a field-programmable gate array (FPGA depicted in FIG. 6*e*) such that the coupling state of the meta-atoms can be dynamically programmed in a pre-designed STC sequence.

The meta-atom extracts energy from the waveguide, which can be viewed as a waveguide-fed magnetic dipole to radiate EM waves into free space. By assuming the lattice size of the meta-atom is much smaller than the wavelength, the meta-atoms can be viewed as sampling the feeding guided waves propagating inside the waveguide at each element position. Suppose that the time modulation period T is much larger than the radio frequency (RF) period, the coupled magnetic field just above the metasurface aperture can be written as:

$$\vec{H}(x,t)=\hat{y}e^{j\omega_0 t}H_0C(x,t)e^{-j\xi_{gw}x}\Pi(x) \quad (1)$$

where $\omega_0$ is the angular frequency of the injected RF signal, and $H_0$ and $\xi_{gw}$ are the constant magnitude of the magnetic field and wavenumber inside the waveguide, respectively. Π(x) is the rectangular function, considering the finite length of the metasurface aperture. Assume that the excitation source is located at x=0, and the power is delivered toward the waveguide with a length of L along the x-direction, then $$\prod(x)=\begin{cases}1, & 0<x<L\\ 0, & \text{else}\end{cases}.$$

C(x, t) in Eq. (1) is the coupling coefficient at different positions and instants of time. If the coupling coefficient is space- and time-invariant, i.e., $C(x, t)=C_0$, the coupled wave by the meta-atom is a slow-wave confined in the waveguide. This is due to the fact that $\xi_{gw}$ is larger than the free-space wavenumber $k_0=\omega_0/c$, where c is the free-space light speed. Now, if C(x, t) is a periodic function of time with a period T, the coupled field above the waveguide also changes with time periodically. The periodic coupling coefficient C(x, t) can be decomposed into Fourier series in the frequency domain $$C(x,t)=\Sigma_{m=-\infty}^{\infty}c(x,\omega_0+m\Delta\omega)e^{jm\Delta\omega t} \quad (2)$$

where Δω is the modulation angular frequency. The Fourier coefficients $c(x, \omega_0+m\Delta\omega)$ can be calculated by $$c(x,\omega_0+m\Delta\omega)=\frac{1}{T}\int_0^T C(x,t)e^{-jm\Delta\omega t}dt \quad (3)$$

$c(x, \omega_0+m\Delta\omega)$ represents the equivalent complex coupling coefficient at the $m^{th}$ order harmonic frequency at the coordinate x. Substituting Eq. (2) into Eq. (1), we obtain the coupled magnetic field given by $$\vec{H}(x,\omega)=\hat{y}H_0\Sigma_{m=-\infty}^{\infty}e^{j(\omega_0+m\Delta\omega)t}c(x,\omega_0+m\Delta\omega)e^{-j\xi_{gw}x}\Pi(x) \quad (4)$$

It can be observed from Eq. (4) that temporal modulation of the coupling coefficient results in a frequency comb centered at $\omega_0$ with the frequency interval Δω for the spectrum lines. Most importantly, the modulation leads to an additional equivalent complex amplitude distribution $c(x, \omega_0+m\Delta\omega)$ adding to the original guided wave at each harmonic frequency. Especially, the field at the fundamental frequency (input frequency) reads $$\vec{H}(x,\omega_0)=\hat{y}H_0e^{j\omega_0 t}c(x,\omega_0)e^{-j\xi_{gw}x}\prod(x) \quad (5)$$

where $$c(x,\omega_0)=\frac{1}{T}\int_0^T C(x,t)dt \quad (6)$$

It can be seen from Eq. (6) that the equivalent coupling coefficient at the fundamental frequency is the time average of the time-varying coupling coefficient, independent of the type of the adopted spatiotemporal modulation strategy C(x, t). Intuitively, periodic change of the instantaneous coupling energy from the waveguide has an average time effect on the coupling coefficient at the fundamental frequency. This unique property is beneficial for achieving fundamental-frequency beam scanning and sideband radiation suppression.

Figure 10:
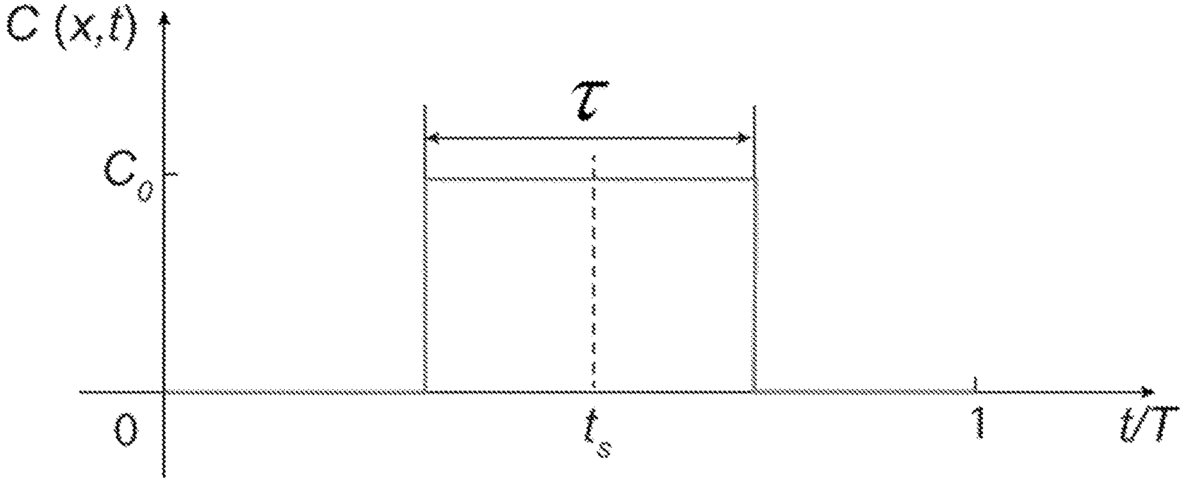
FIG. 10 shows the coupling coefficient C(x, t) in one modulation time period.

The simplest type of STC modulation is considered, i.e., ON-OFF switching of the PIN diodes, corresponding to switching each meta-atom between the coupling (coding element "1") and non-coupling (coding element "0") states. The coupling coefficient based on this 1-bit coding scheme in one time-periodic T can be written as $$C(x,t)=C_0\begin{cases}1, & t_s(x)-\tau(x)/2\le t/T\le t_s(x)+\tau(x)/2\\ 0, & \text{else}\end{cases} \tag{7}$$

where $t_s(x)$ and $\tau(x)$ are the normalized time shift and duty cycle at the position x, respectively, and subject to $0\le t_s(x), \tau(x)\le 1$. The form of C(x, t) is shown in the FIG. 10. The ON-OFF switching between coupling and non-coupling energy from the waveguide is a 1-bit "amplitude modulation" (AM) scheme. In this case, the equivalent complex coupling coefficient in Eq. (3) can be represented as:

$$c(x,\omega_0+m\Delta\omega)=C_0\tau(x)\text{sinc}[\pi m\tau(x)]e^{-j2\pi m t_s(x)} \tag{8}$$

From Eq. (8), the amplitude of the equivalent coupling coefficient is determined by the normalized duty cycle $\tau$, while the imparted phase shift by the STC scheme mainly depends on the normalized time shift $t_s$. The aperture field above the waveguide at the $m^{th}$ harmonic frequency can be written as $$\vec{H}(x,\omega_0+m\Delta\omega)=\hat{y}H_0C_0\tau(x)\text{sinc}[\pi m\tau(x)]e^{-j[\xi_{gw}x+2\pi m t_s(x)]}\Pi(x) \tag{9}$$

The corresponding far-field scattering patterns of the metasurface antenna at the $m^{th}$ harmonic frequency $\omega_0+m\Delta\omega$ can be obtained by taking the spatial Fourier transform of Eq. (9) and given by:

$$H_{rad}(\theta,\omega_0+m\Delta\omega)=H_0C_0FT\{\tau(x)\text{sinc}[\pi m\tau(x)]e^{-j[\xi_{gw}x+2\pi m t_s(x)]}\Pi(x)\} \tag{10}$$

In the above theoretical modeling, the mutual coupling between meta-atoms is ignored, considering that the slot elements operate at the off-resonance state. On the other hand, only the fundamental frequency (input frequency) of the guided wave is considered in this model for the following reasons. First, the ON-OFF switching of the PIN diodes has little perturbation on the guided wave (See FIGS. 8*a*-8*d*), and thereby the modulation effect of the guided wave is negligible. More importantly, the higher-order harmonic frequencies cannot satisfy the phase-matching condition and are suppressed inside the waveguide as revealed in the following sections.

According to Eq. (8), the STC scheme introduces an additional momentum $$k_m=2\pi m\frac{dt_s(x)}{dx}$$

along the x-axis to the coupled field. Accordingly, Eq. (9) can be rewritten as:

$$\vec{H}(x,\omega_0+m\Delta\omega)=\hat{y}H_0C_0\prod(x)\begin{cases}\tau(x)e^{-j\xi_{gw}x}, & m=0\\ \tau(x)\text{sinc}[\pi m\tau(x)]e^{-j(\xi_{gw}+k_m)x}, & m=\pm1,\pm2,\ldots\end{cases} \tag{11}$$

At first glance, the 1-bit STC metasurface antenna seems like the 1-bit free-space-only STMMs with very limited spatial and frequency manipulation flexibilities. However, in the following sections, it is demonstrated that 1-bit STC metasurface antennas, counterintuitively, possess powerful EM wave controllability in both spatial and spectral domains via fully leveraging its unique guided-wave-driven nature. The illustrative examples include high-efficiency frequency conversion, fundamental-frequency continuous beam scanning, and multi-harmonic independent control—all these cannot be possible for conventional 1-bit free-space-only STMMs.

Figure 2A:
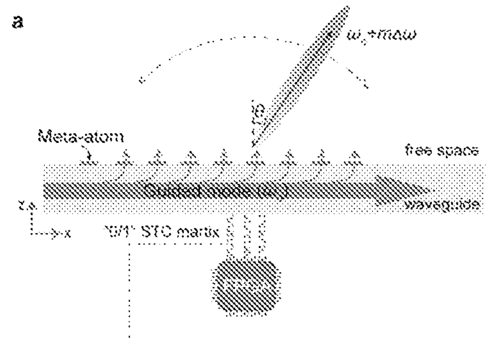
FIGS. 2*a*-2*k* depict high-efficiency frequency conversion and beam steering. 2*a* is a schematic of the STC metasurface antenna for high-efficiency frequency conversion and beam scanning. The input guided waves at the frequency $\omega_0$ are translated into free-space waves with a target frequency $\omega_0+m\omega_m$, while other undesired harmonics are highly suppressed. The output angle of the target harmonic can be controlled at will according to the applied digital "0/1" STC matrix.
Figure 2B:
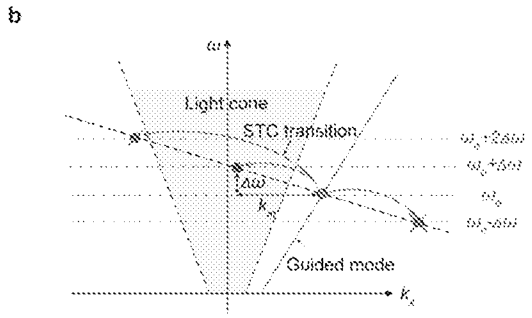

Frequency conversion and beam steering. As a first demonstrating example, the STC metasurface antenna is considered to realize frequency conversion—a process that translates the input waveguide signal at one frequency into another in free space, as illustrated in FIG. 2*a*. The dispersion diagram in FIG. 2*b* qualitatively explains the operating principle. The input signal with the frequency $\omega_0$ is injected into the waveguide and forward propagating along the +x-direction in the form of guided waves, corresponding to the red dot located at the guided-mode dispersion curve in FIG. 2*b*. According to Eq. (11), the space-time modulation results in new spectrum generation with frequency interval $\Delta\omega$ and an additional tangential momentum $k_m$ to each harmonic frequency. This momentum is leveraged to push the target conversion frequency (+1 harmonic in this case) into the light cone, such that it can radiate as leaky waves with a specified radiation angle $\theta_r$. Accordingly, other higher-order harmonics are imparted by a tangential momentum as well, but m times that of the +1 harmonics. It can be observed from FIG. 2*b* that other higher-order harmonics are out of the light cone; thereby, they cannot be radiated into free-space due to the momentum mismatch. Most importantly, these unwanted higher-order harmonics are prohibited inside the waveguide because they cannot fulfill the phase-matching conditions. As such, only the target +1 harmonic frequency can be generated and extracted into free space, while other unwanted harmonics are all suppressed. This intriguing phenomenon that selects harmonics for free-space radiation is termed as the "self-filtering" property of the waveguide-driven metasurface antennas. This unique property distinguishes the metasurface antenna of the present invention from a conventional free-space-only metasurface, in which all the harmonics are naturally phase-matched for radiation.

To allow the target harmonic frequency to radiate in the direction $\theta_r$, the compensating momentum imparted by the STC modulation should satisfy $$\xi_{gw}+k_m=\xi_m\sin\theta_r \tag{12}$$

where $\xi_m$ is the free-space wavenumber at the target $m^{th}$ harmonic frequency. The required normalized time shift $t_s(x)$ in the 1-bit STC scheme can be resolved $$t_s(x)=\frac{\xi_m\sin\theta_r-\xi_{gw}}{2m\pi}x \tag{13}$$

Here is demonstrated the upward conversion to the +1 harmonic frequency and beam direction manipulation. To avoid the +2 frequency harmonics entering the light cone as the +1 harmonic scans from the backward to the forward end-fire direction, the normalized duty cycle $\tau$ is set as 0.5. As such, the amplitude of the equivalent coupling efficient for the +2 harmonics is 0. The radiation direction of the extracted beam can be flexibly tuned by changing the time shift $t_s(x)$ according to Eq. (13).

Figure 2C:
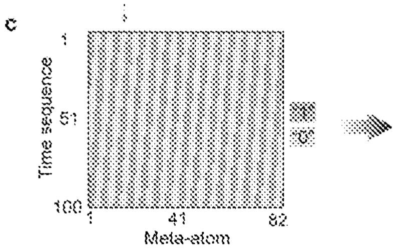
Figures 11A, 11B, 11C:
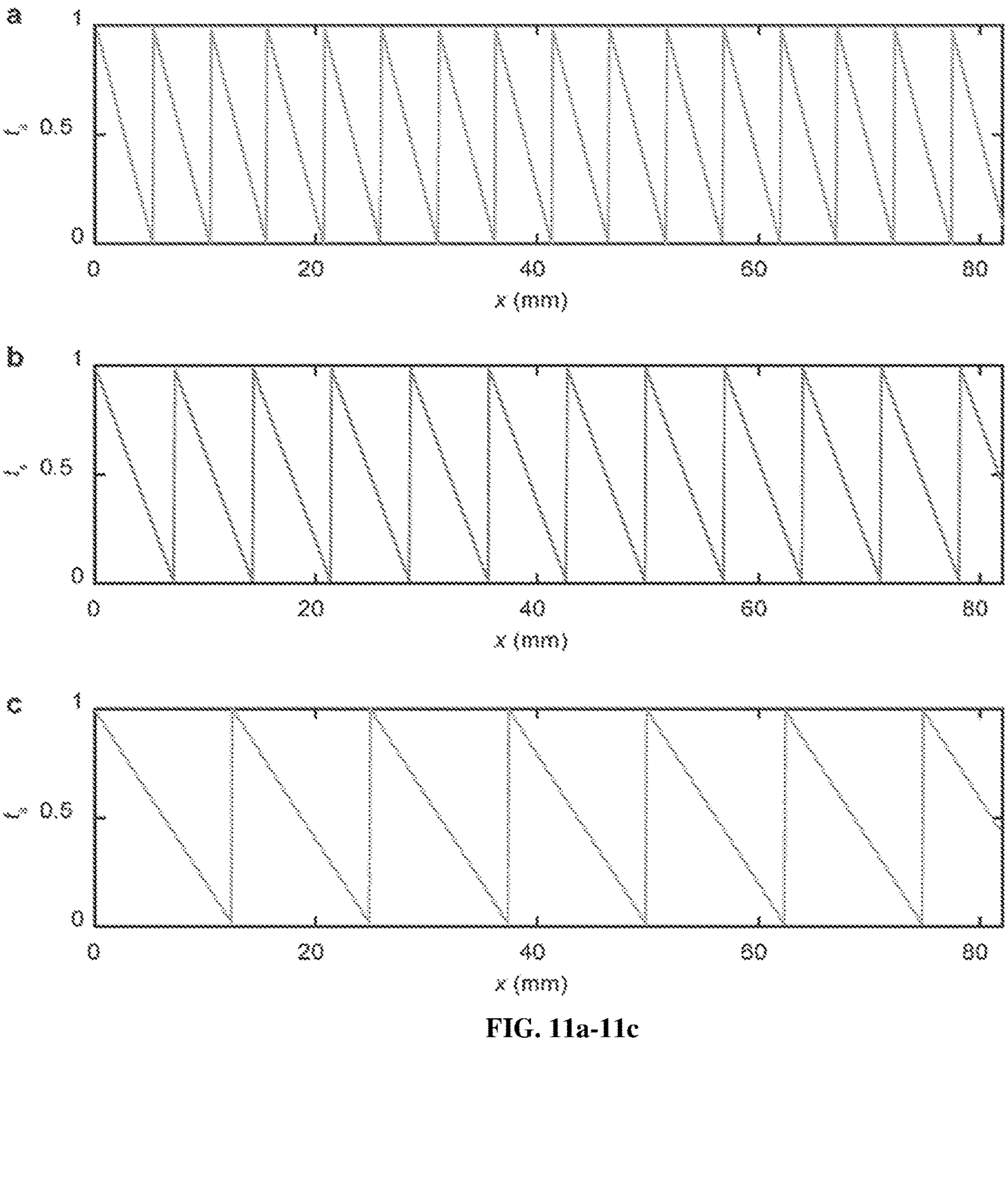
FIGS. 11*a*-11*c* show the required normalized time shifts for frequency conversion.

To validate the above concept and design, an STC metasurface antenna is realized based on a substrate integrated waveguide (SIW) operating at 27 GHz, as described above. As illustrative examples the output angle of the translated +1 harmonic scans to −50°, −10°, and 30°, respectively is considered. Their corresponding required time shifts $t_s(x)$ are given in FIG. 11. The ON-OFF sequence can be obtained once $t_s(x)$ and $\tau$ are determined. The STC matrix for each beam direction case can be obtained by sampling the ON-OFF sequence at each meta-atom position, and the results are shown in FIGS. 2*c-e*. Their corresponding measured power distributions at different harmonics are given in FIGS. 2 *f-h*, respectively (See Table 2 for the specific power distribution and calculation). It can be clearly observed that the target +1 harmonic is dominant with a conversion efficiency higher than 80%. The corresponding measured radiation patterns at the +1 harmonics are illustrated in FIGS. 2*i-k*, agreeing well with the predicted results calculated by Eq. (10). Moreover, from the scattering patterns in FIGS. 2*i-k*, the converted waves at the +1 harmonic frequency can be correctly scanned to the intended directions.

TABLE 2

Figure 2F:
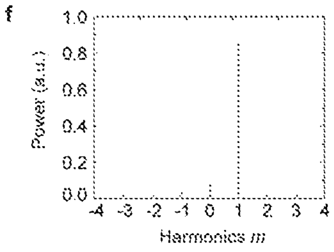
Figure 2I:
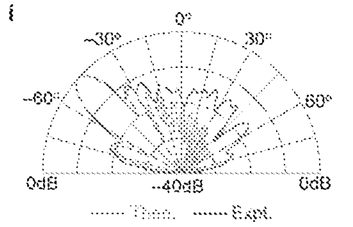
Figure 2D:
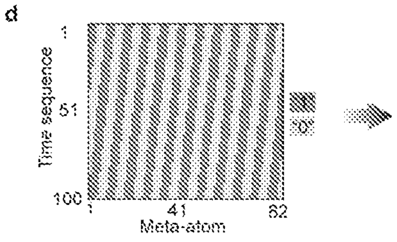
Figure 2G:
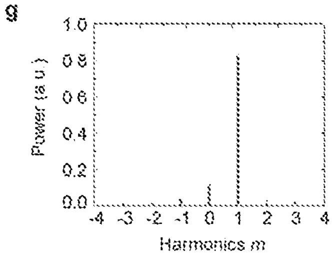
Figure 2J:
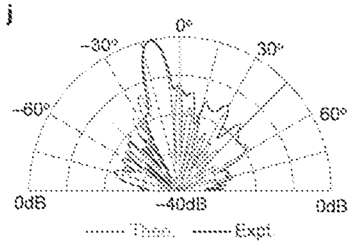
Figure 2E:
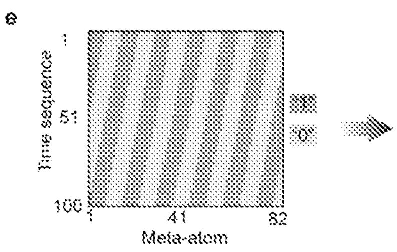
Figure 2H:
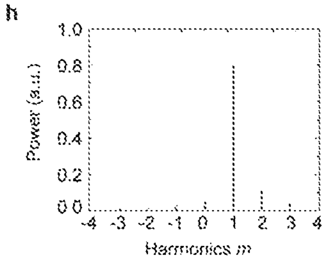
Figure 2K:
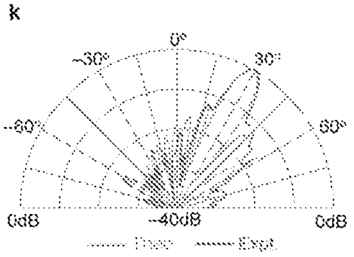

Detailed measured power distributions of FIGS. 2f-2h

| Harmonics | −3rd | −2nd | −1st | 0 | +1st | +2nd | +3rd |
|---|---|---|---|---|---|---|---|
| Power dist. in FIG. 2f | 0.009 | 0.007 | 0.026 | 0.083 | 0.852 | 0.010 | 0.010 |
| Power dist. in FIG. 2g | 0.007 | 0.004 | 0.028 | 0.107 | 0.823 | 0.018 | 0.010 |
| Power dist. in FIG. 2h | 0.001 | 0.002 | 0.016 | 0.037 | 0.801 | 0.108 | 0.033 |

Furthermore, the target harmonic frequency to be converted into and radiated into free space by altering the STC matrix can be freely chosen. To this end, the above STC matrix is compressed for the +1 harmonic radiation down to 1/m in the time domain and repeat the new matrix m time in one modulation period T. The synthesized STC matrices for the −1, −2, and −3 harmonics conversions are given in FIGS. 3*a*-3*c*. The corresponding measured harmonic power distributions for the three conversion cases are illustrated in FIGS. 3*d*-3*f*, respectively. The measured scattering patterns at different harmonics are shown in FIGS. 3*g-i*. Again, we observe that the desired −1, −2, and −3 harmonics are dominant for the output free-space waves, with conversion efficiency larger than 82% (See Table 3 for the specific measured power distributions). Moreover, the STC metasurface antenna can launch a high-directivity beam at the target harmonic frequency, while all other undesired harmonics are highly suppressed.

TABLE 3

Detailed measured power distributions in FIGS. 3d-3f

| Harmonics | −3rd | −2nd | −1st | 0 | +1st | +2nd | +3rd |
|---|---|---|---|---|---|---|---|
| Power dist. in FIG. 3d | 0.009 | 0.019 | 0.819 | 0.113 | 0.026 | 0.003 | 0.007 |
| Power dist. in FIG. 3e | 0.001 | 0.883 | 0.001 | 0.090 | 0.001 | 0.025 | 0.001 |
| Power dist. in FIG. 3f | 0.857 | 0.003 | 0.001 | 0.104 | 0.001 | 0.001 | 0.033 |

Figure 12:
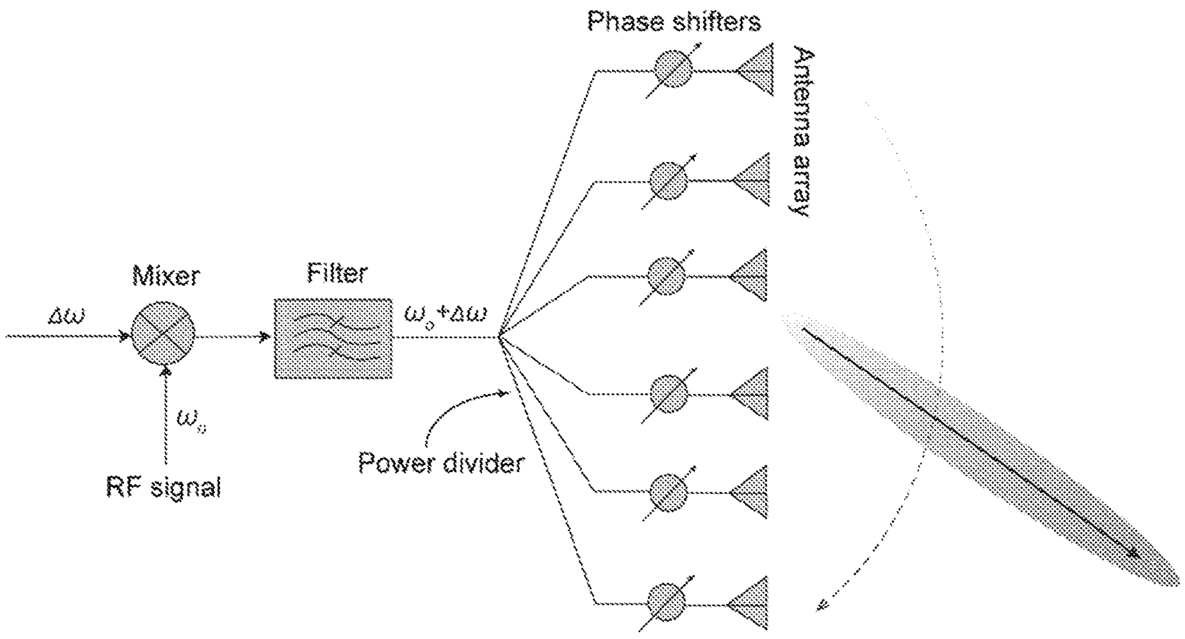
FIG. 12 is the architecture of a conventional heterodyne transmitter.

In a physical sense, the STC metasurface antenna can be interpreted as a heterodyne transmitter for implementing frequency mixing, filtering, phase shifting as well as radiation (See FIG. 12 for the configuration of a traditional heterodyne transmitter). The temporal modulation in the STC metasurface antenna allows mixing the input RF and modulation signals to generate new harmonics. The stringent momentum matching conditions equal a perfect band-pass filter that selects the target harmonic frequency to pass through while filtering out unwanted ones. The time shifts at different positions $t_s(x)$ lead to an equivalent phase shifter attached to each meta-atom. Each meta-atom behaves as a magnetic dipole antenna element that radiates EM waves into free space. As a result, the functionalities of various active and passive components in traditional RF heterodyne transmitters, including mixers, filters, power dividers, phase shifters, and antenna arrays—all can be implemented by and integrated into the single STC metasurface antenna of the present invention. This provides a paradigm shift in wireless device designs with great advantages of simpler architecture, higher integration, higher signal-to-noise ratio (S/N), as well as lower power consumption. For traditional free-space-only STMMs, the undesired harmonics, also known as sidebands, are naturally phase-matched for radiation, causing severe spectrum pollution. Moreover, using discrete phase modulation will significantly reduce the conversion efficiency. For instance, a 1-bit free-space-only STC metasurface theoretically has a maximum power conversion efficiency of around 40%, and the rest contributes to unwanted harmonics radiations. By contrast, our 1-bit STC metasurface antennas feature significantly higher conversion efficiency of higher than 80%.

Figure 4A:
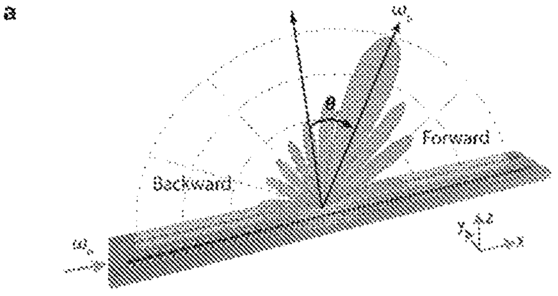
FIGS. 4*a*-4*l* depict fundamental-frequency beam scanning.
Figure 13A:
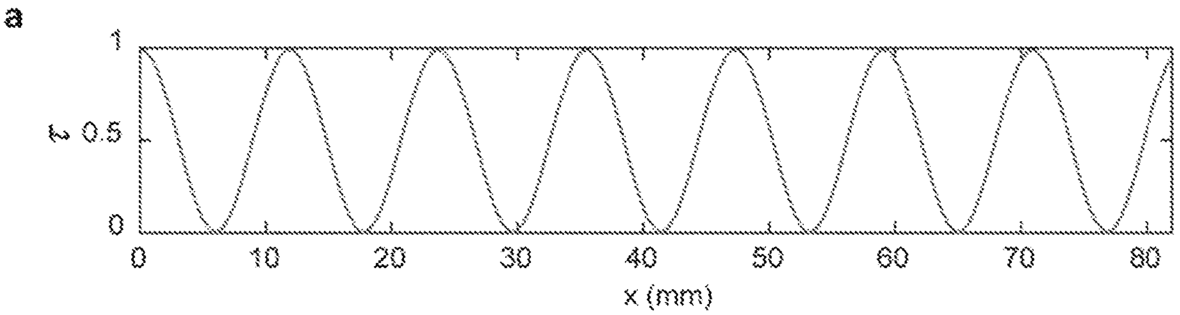
FIGS. 13*a*-13*e* is a performance comparison using different STC matrices for fundamental-frequency beam scanning.
Figure 13B:
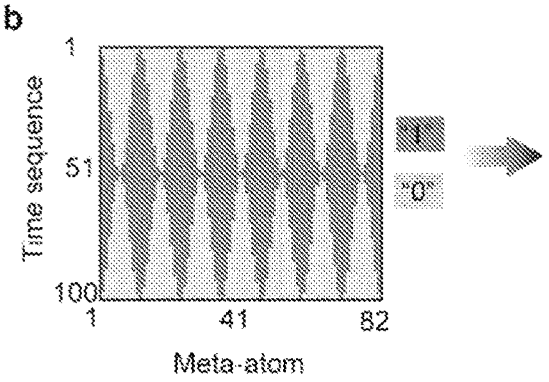
Figure 13D:
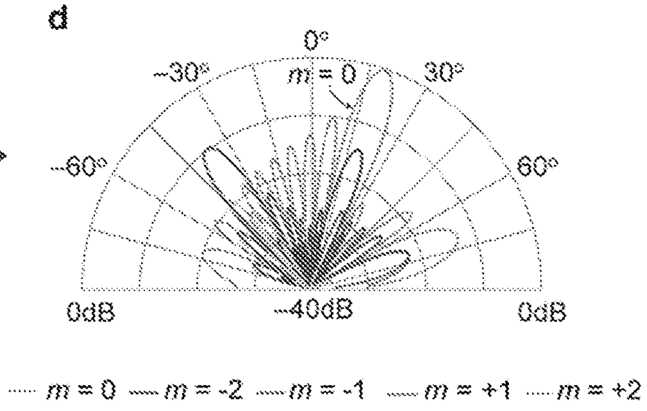

Fundamental-frequency continuous beam scanning. In the inventive design, the beam steering at harmonic frequencies is achieved by varying the momentum imparted by the STC scheme. However, the exact mechanism cannot be applied to the fundamental frequency. According to Eq. (11), the STC scheme only introduces an equivalent amplitude without producing tangential momentum at $\omega_0$. Here this equivalent amplitude is leveraged to perform spatial AM for fundamental-frequency beam scanning, as illustrated in FIG. 4*a*. Spatial AM, an analogy to the well-known AM radio technology but in the spatial domain, allows the n=−1 space harmonic to become fast and radiate into free space. A sinusoidal amplitude distribution along the waveguide aperture should be formed to achieve high-directivity radiation. To this end, the normalized duty cycle should be $$\tau(x) = \bar{\tau}\left[1 + M\cos\left(\frac{2\pi}{\Lambda}x\right)\right] \tag{14}$$

where $\bar{\tau}$ is the average duty cycle, M is the modulation depth, and $\Lambda$ is the spatial modulation period. The STC matrix for radiation direction $\theta_r$=20° and its corresponding radiation pattern calculated by Eq. (10) in shown in FIG. 13*d*. Although the STC metasurface antenna launches a high-directivity beam at $\omega_0$, high radiations are also observed in other undesired sidebands, which is caused by the higher-order space harmonics at these higher-order frequency harmonics.

Figure 4B:
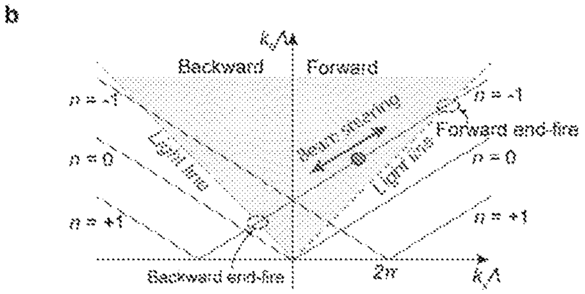
Figure 13C:
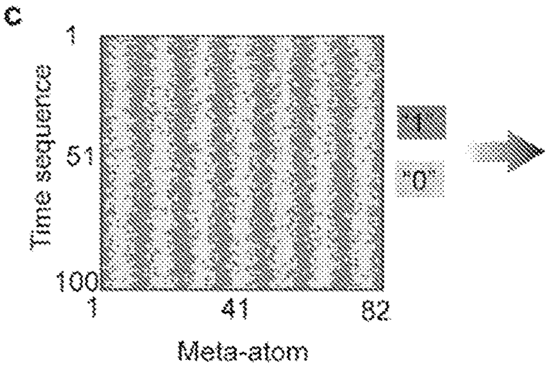
Figure 13E:
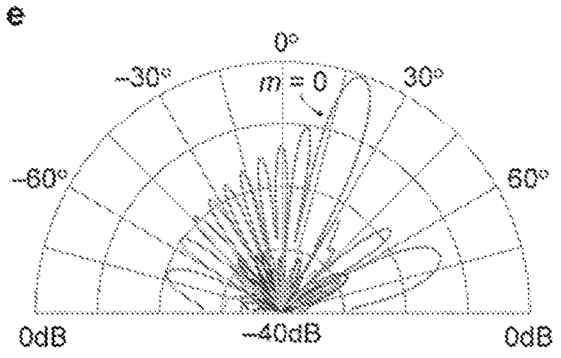
Figure 14E:
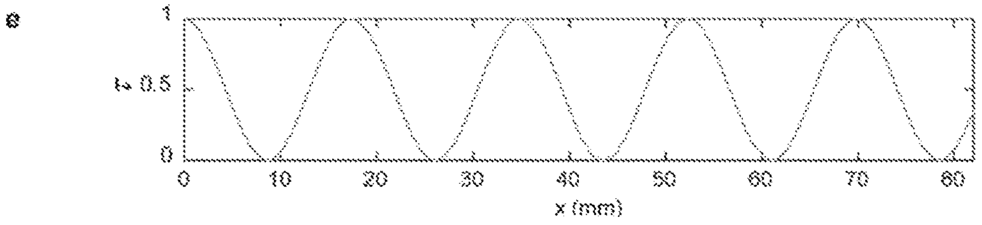
Figure 14F:
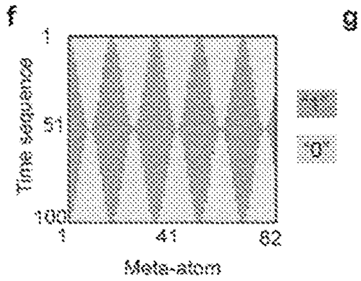
Figure 14G:
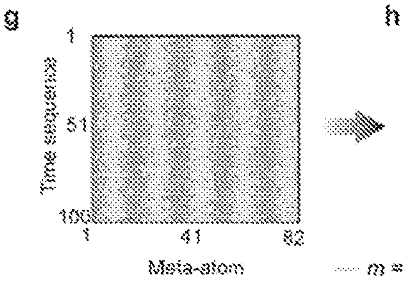
Figure 14H:
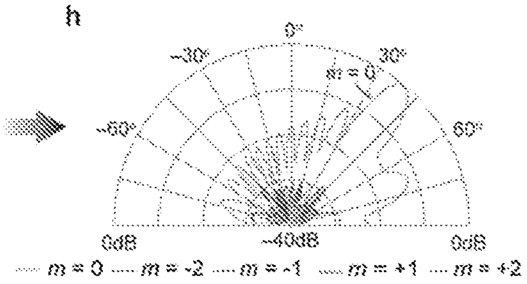
Figure 14I:
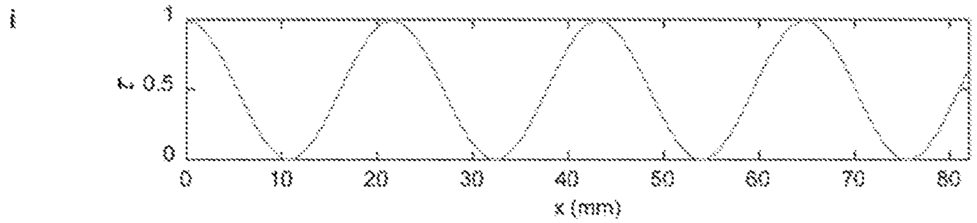
Figures 14J, 14K, 14L:
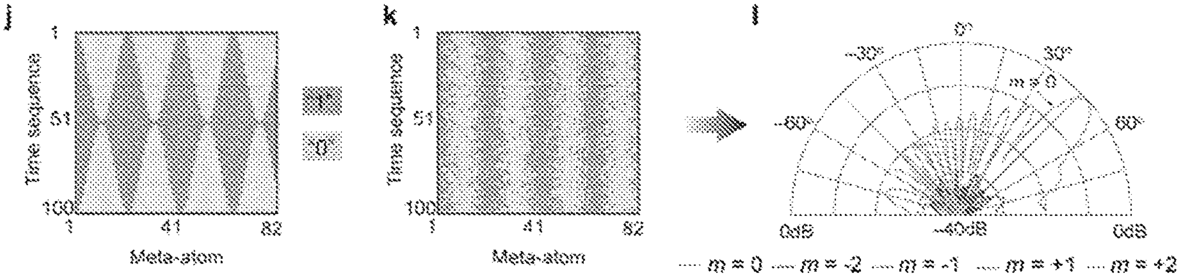

In the above theoretical formulation section, it is revealed in Eq. (6) that the equivalent amplitude at the fundamental frequency is the time average of the radiating state of the meta-atom while irrelevant to the type of the adopted STC strategy. To suppress the undesired sidebands, the original STC matrix is randomized but keeps the time-average radiation state in one modulation period T fixed. As such, an equivalent sinusoidal amplitude distribution at $\omega_0$ can be maintained yet introduce random equivalent phase modulations to higher-order harmonic frequencies, which the phase-matching conditions of the waveguide will filter out. The new STC matrix and its calculated radiation patterns are depicted in FIGS. 13*c* and 13*e*, respectively. It can be observed that the pencil-like beam is generated at the fundamental frequency $\omega_0$ while the undesired sidebands are all highly suppressed at least 28 dB below that of the fundamental frequency. Furthermore, the output angle of the extracted wave can be continuously tuned from the backward end-fire toward forward end-fire by varying the spatial modulation period Λ, as illustrated in the Brillouin diagram in FIG. 4*b*. The radiation direction of the n=−1 space harmonic is determined by $$\theta_r = \sin^{-1}\left(\frac{\xi_{gw}}{\xi_0} - \frac{2\pi}{\Lambda\xi_0}\right) \tag{15}$$

Figure 4C:
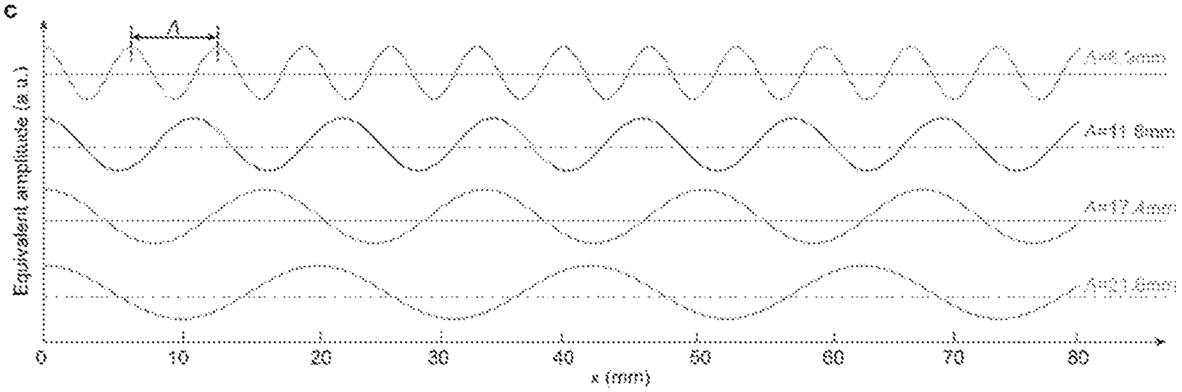
Figures 4D, 4E, 4F, 4G, 4H, 4I, 4J, 4K, 4L:
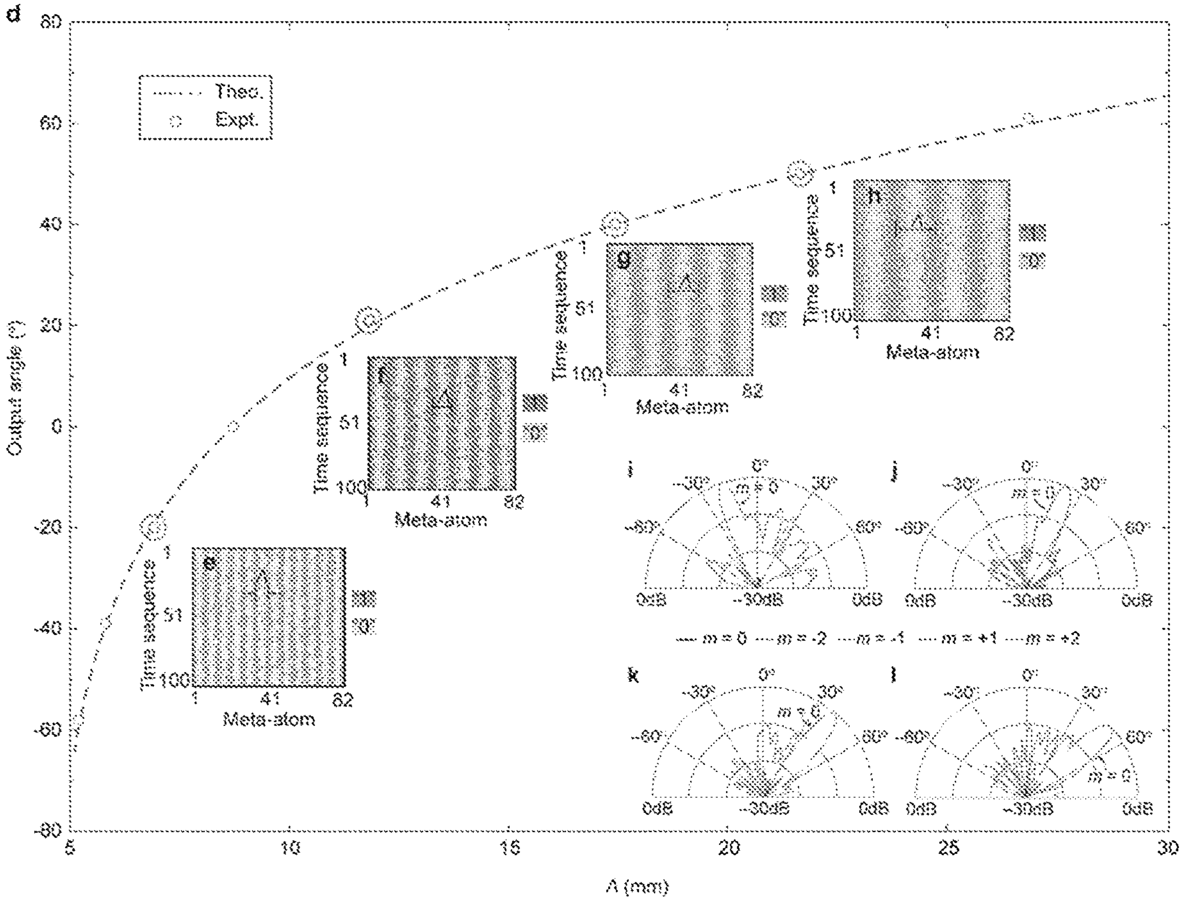
Figure 15A:
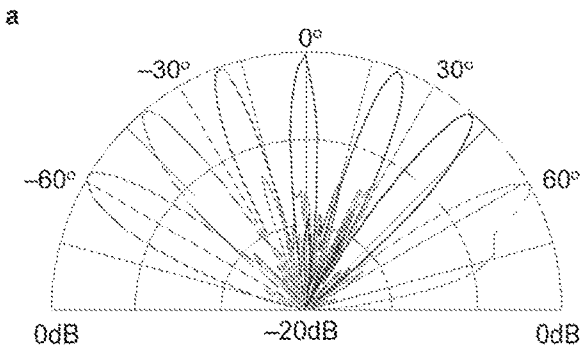
FIGS. 15*a*-15*b* are the measured radiation performances of the STC metasurface for fundamental-frequency beam scanning.
Figure 15B:
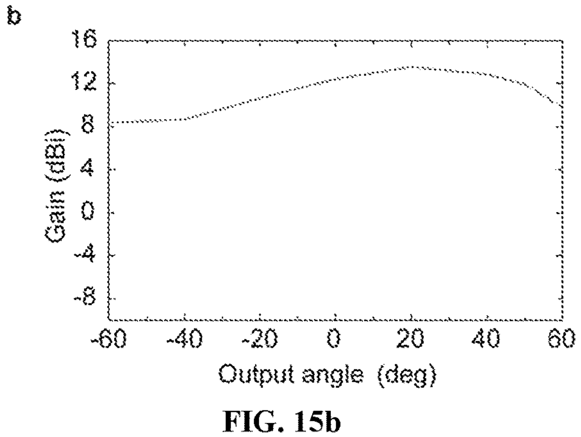
Figure 16A:
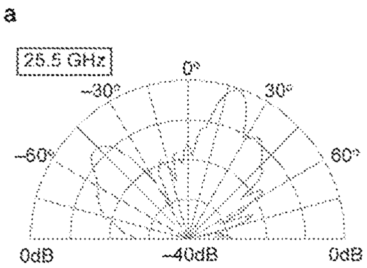
FIGS. 16*a*-16*e* shows the bandwidth performances of the STC metasurface for fundamental-frequency beam scanning.
Figure 16B:
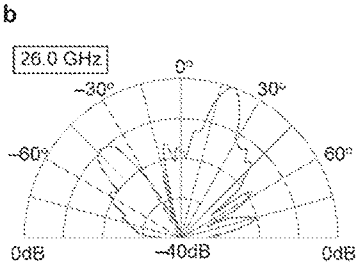
Figure 16C:
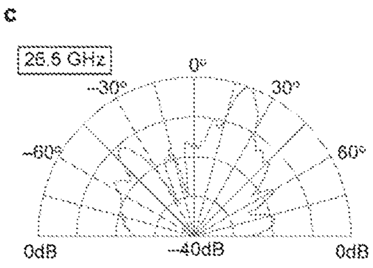
Figure 16D:
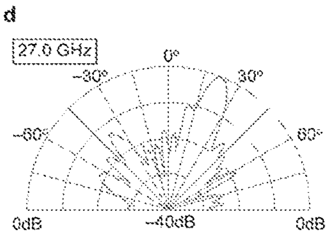
Figure 16E:
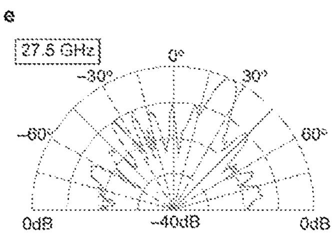

FIG. 4*d* depicts the calculated and measured relationship between the output angle $\theta_r$ and the spatial modulation period Λ. As illustrative examples, the output angles of −20°, +20°, +40°, and +50° are considered, whose corresponding required equivalent amplitude distributions or normalized duty cycles along the length of the metasurface aperture are depicted in FIG. 4*c*. We observe that the spatial modulation period increases for forward beam scanning. The corresponding STC matrices after randomization are depicted in FIGS. 4*e*-4*h*, respectively, and the corresponding measured scattering patterns at different harmonic frequencies are given in FIGS. 4*i*-4*l*, respectively. It can be observed that the radiation direction at the fundamental frequency can be precisely and dynamically controlled. Moreover, all the undesired sidebands are highly suppressed with measured spectrum purities as high as 95% in all the scanning cases (See Table 4). The measured radiation patterns with a 20° increment at $\omega_0$ are given in FIG. 15*a*. The measured peak gain of the metasurface antenna is 13.5 dBi. The STC metasurface antennas also exhibit good radiation performance as the input frequency ranges from 25.5 to 27.5 GHz (See FIG. 16). These results verify that our metasurface antenna can achieve continuous full-space beam scanning at the fundamental frequency based on the 1-bit STC scheme.

TABLE 4

Detailed measured power distributions in FIGS. 4i-4l

| Harmonics | −3rd | −2nd | −1st | 0 | +1st | +2nd | +3rd |
|---|---|---|---|---|---|---|---|
| Power dist. in FIG. 4i | 0.008 | 0.003 | 0.004 | 0.960 | 0.005 | 0.003 | 0.006 |
| Power dist. in FIG. 4j | 0.003 | 0.003 | 0.005 | 0.975 | 0.003 | 0.003 | 0.006 |
| Power dist. in FIG. 4k | 0.007 | 0.004 | 0.008 | 0.951 | 0.013 | 0.009 | 0.005 |
| Power dist. in FIG. 4l | 0.005 | 0.005 | 0.012 | 0.962 | 0.006 | 0.003 | 0.003 |

Figure 5A:
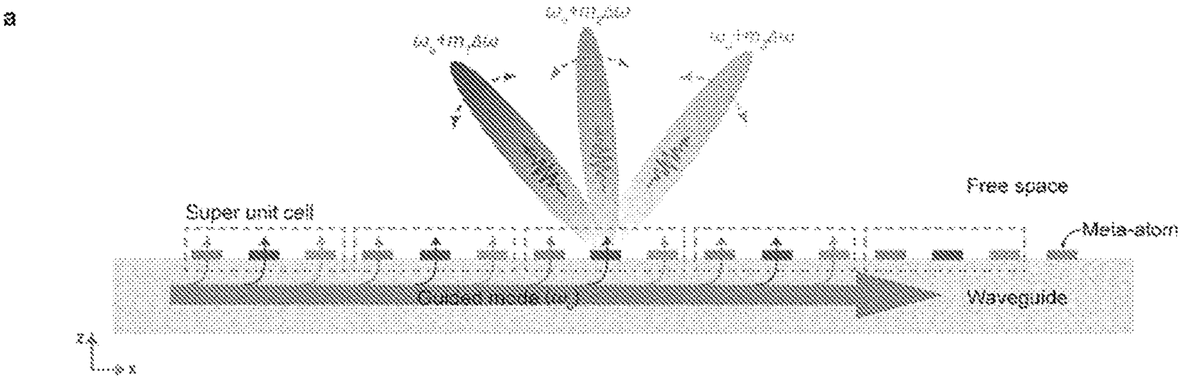
FIGS. 5*a*-5*f* show multi-harmonic independent control.

Multi-harmonic independent control. Previous examples manipulate only one specific harmonic frequency while suppressing other undesired harmonics. In some scenarios, such as multi-user wireless communications, independent and simultaneous control of multi-harmonic is critically essential. Here, the Nyquist Sampling Theorem is used, a fundamental bridge between the continuous and discrete worlds, to realize multi-harmonic independent control. The Nyquist Sampling Theorem states that a signal can be perfectly reconstructed if the waveform is sampled over twice its highest frequency component. For the spatial version, the requirement translates to the spatial sampling should be smaller than half of the operating wavelength across the metasurface antenna aperture. This theorem opens the possibility for the digital STC metasurface to perform multi-harmonic conversion and independent control. As shown in FIG. 5*a*, meta-atoms couple and convert the energy from the waveguide into free-space waves at different intended harmonic frequencies. The neighboring meta-atoms form a super unit cell that can launch free-space waves simultaneously at multi-harmonic frequencies. The metasurface is free of high-order diffraction for all desired harmonic frequencies as long as the spatial sampling of the super unit cell satisfies the Nyquist criterion, i.e., the lattice of the super unit cell is smaller than half of the free-space wavelength.

Figure 5B:
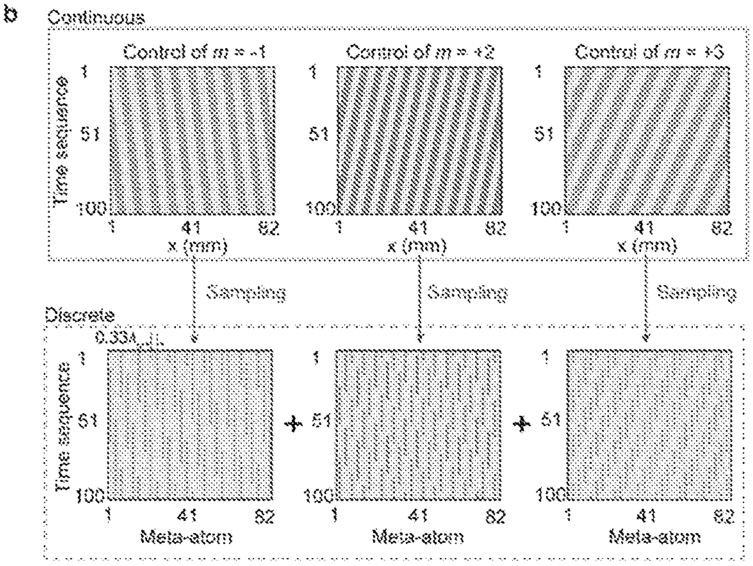
Figure 5C:
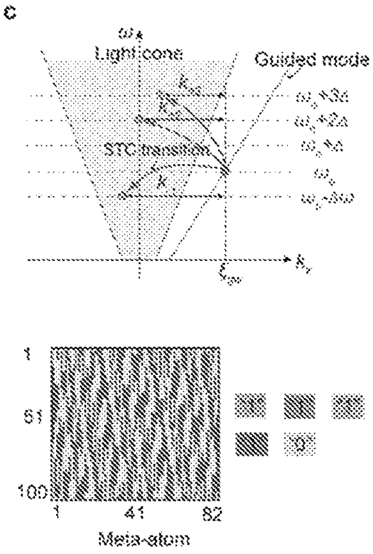

Without loss of generality, independent control of three harmonics, i.e., m=−1, +2, +3 with output angles of 0°, −15°, and +15°, respectively is demonstrated. The design process for the multi-harmonic independent control is shown in FIG. 5*b*. Following the design process in the above frequency conversion section, the required continuous space-time-modulation sequence is first obtained for the three separate frequency conversion cases, as shown in FIG. 5*b*. The digital metasurface alternately samples the three continuous matrices at each meta-atom position and gets the discrete STC matrices for the three frequency-conversion cases. As illustrated in the dispersion diagram in FIG. 5*c*, each discrete STC matrix is responsible for introducing an independent tangential momentum $k_m$ to push one corresponding harmonic frequency into the light cone and radiate the wave into the intended direction but highly suppressing other harmonics. The final STC matrix combines the three individual discrete STC matrices, as shown in FIG. 5*b*.

Figure 5D:
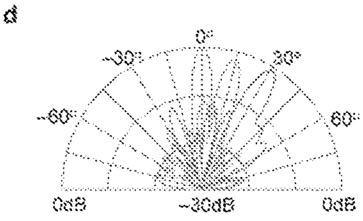
Figure 5E:
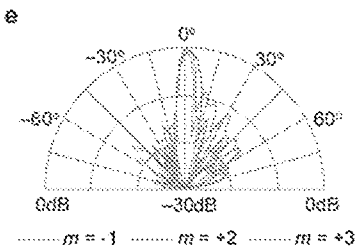
Figure 5F:
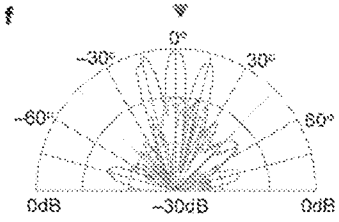
Figure 17A:
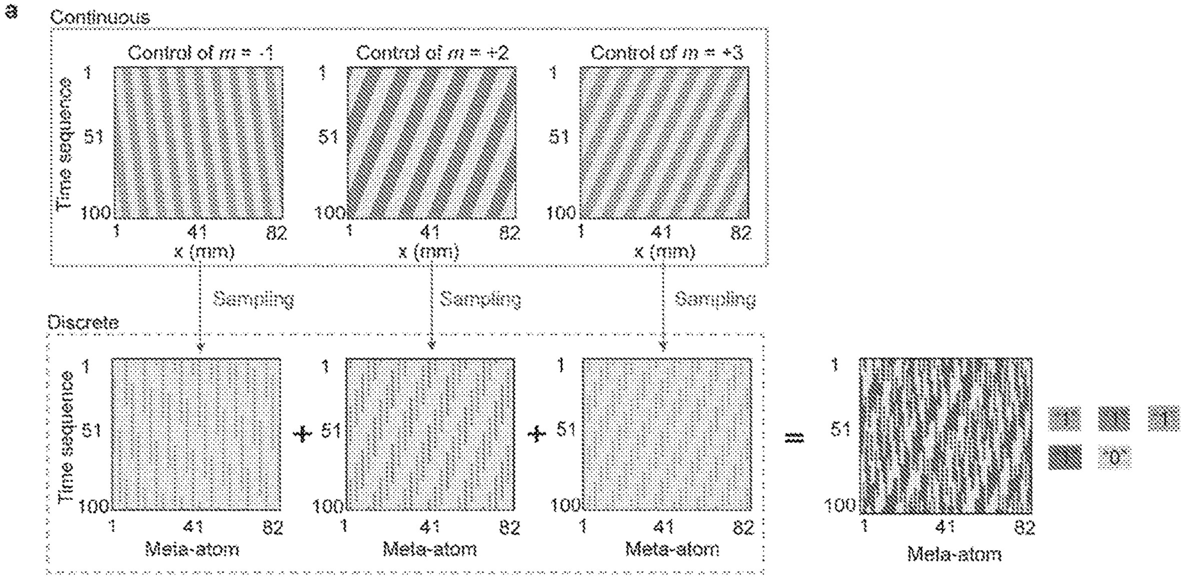
FIGS. 17*a*-17*b* are the STC matrices for multi-harmonic independent control.
Figure 17B:
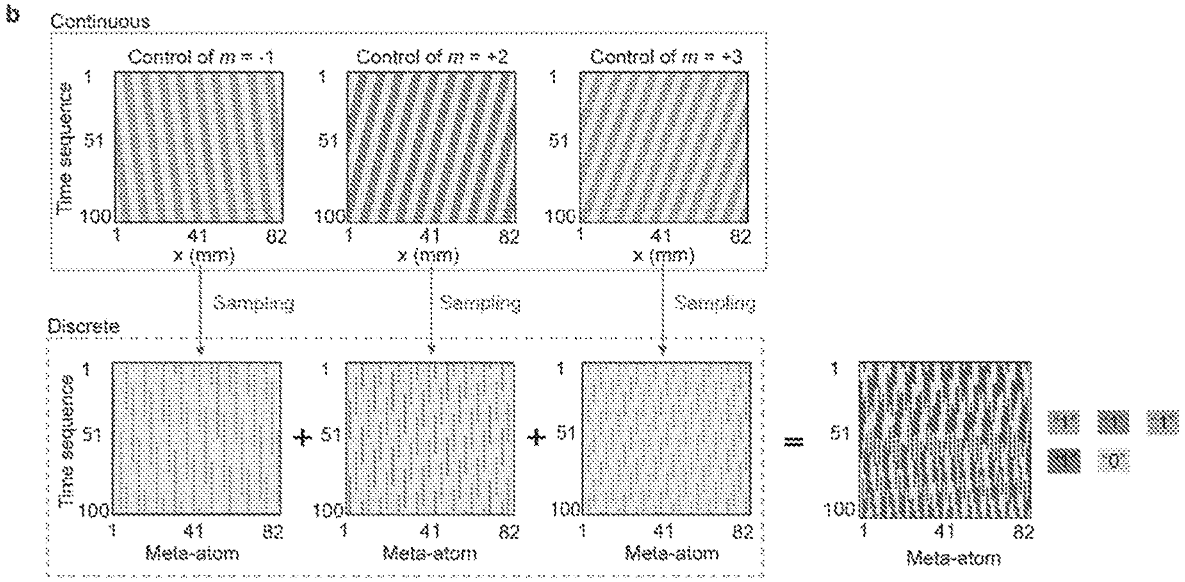

Due to the deep-subwavelength nature of the designed meta-atom, the spatial sampling of the super unit cell is around $0.33\lambda_0$ in this design, satisfying the Nyquist sampling condition. As such, the 1-bit STC metasurface antenna can simultaneously and independently control the tri-harmonic radiations as well as their beam output angles. The measured radiation patterns at the three harmonics are illustrated in FIG. 5*f*, from which it is observed that the output angles are well located at the desired radiation directions of 0°, −15°, and +15° for the −1, +2, +3 harmonics, respectively. Following the same strategy, the radiation directions of the three harmonics are further manipulated by changing the STC matrix. For instance, the output angles of the three harmonics are all steered to the broadside direction ($\theta_r$=0°). The required STC matrices are given in FIG. 17*a*, and the corresponding measured scattering patterns are shown in FIG. 5*e*. As another illustrative example, the beam directions are directed to 0°, +30°, and +15° for the −1, +2, +3 harmonics, respectively. FIG. 17*b* displays the STC matrix, and FIG. 5*d* illustrates the corresponding measured radiation patterns. Again, it is seen that the output beam at the three harmonics can be correctly radiated into the intended directions. All these results verify the flexibility of the 1-bit STC metasurface antenna for multi-harmonic simultaneous and independent control.

The present invention provides a waveguide-driven STC metasurface antenna to extract and mold guided waves into any desired free-space waves in both momentum and frequency domains. The complex EM wave manipulation is achieved by the simplest 1-bit switching between the coupling and non-coupling from the waveguide for each meta-atom in a pre-designed space-time sequence. As an example, the 1-bit STC metasurface antenna has been formed to demonstrate high-efficiency frequency conversion, fundamental-frequency continuous beam scanning, and independent control of multiplex harmonics, all with experimental verifications. The 1-bit STC metasurface can realize all the functionalities of a traditional complex heterodyne transmitter generally including mixers, filters, power dividers, phase shifters, and antenna arrays. Compared with free-space-only STMMs, our STC metasurface antenna is free of sideband pollution. It features a much simpler coding strategy (1-bit) by taking advantage of the momentum matching condition of waveguides. Most importantly, the STC metasurface antenna is directly driven by guided waves, allowing it to integrate with in-plane sources seamlessly.

The STC metasurface antenna can be extended to a 2-D aperture by periodically repeating the 1-D metasurface along the y-axis, fed by a power dividing network. The proposed concept can also be extended to the terahertz and optical spectrums, as well as to acoustic waves by use of alternative materials and active elements such as graphene, electro-optic and photo-acoustic media. The developed technology equips integrated devices with unprecedented free-space EM waves controllability in both spectral and spatial spaces. The technology may be applied to a broad spectrum of products where integrated devices require agile access to free space, such as next-generation mobile communications, terahertz security screening, Li-Fi, and LiDAR systems.

Example

Figure 8A:
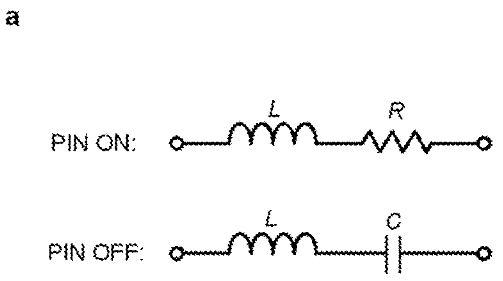
FIGS. 8*a*-8*d* show meta-atom simulation.
Figure 8B:
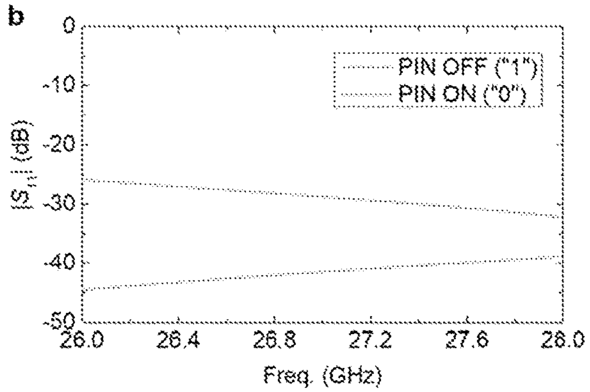
Figure 8C:
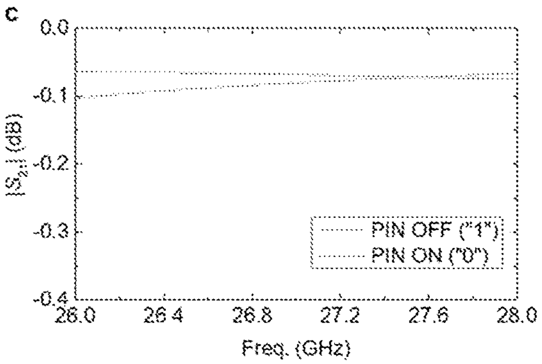
Figure 8D:
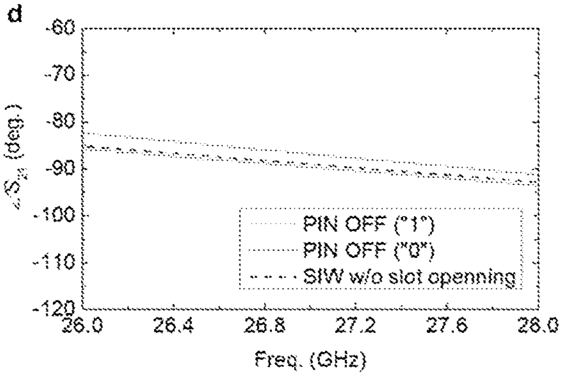
Figure 9A:
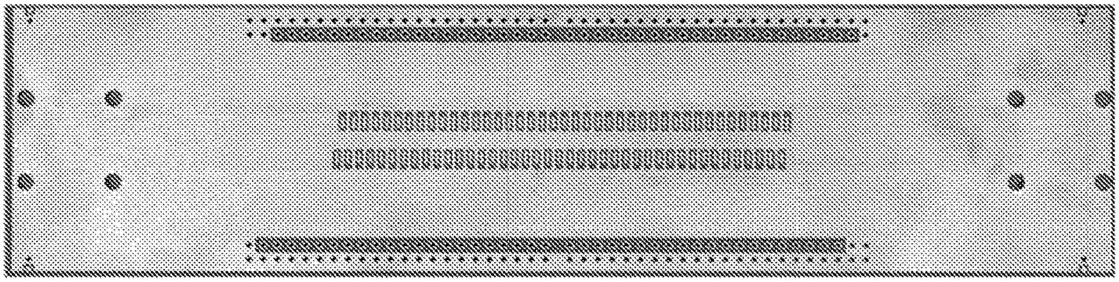
FIGS. 9*a*-9*c* are photographs of a fabricated STC metasurface antenna prototype.
Figure 9B:
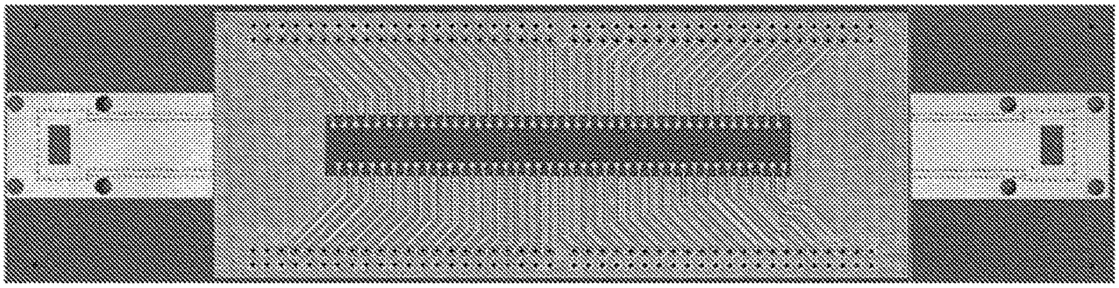
Figure 9C:
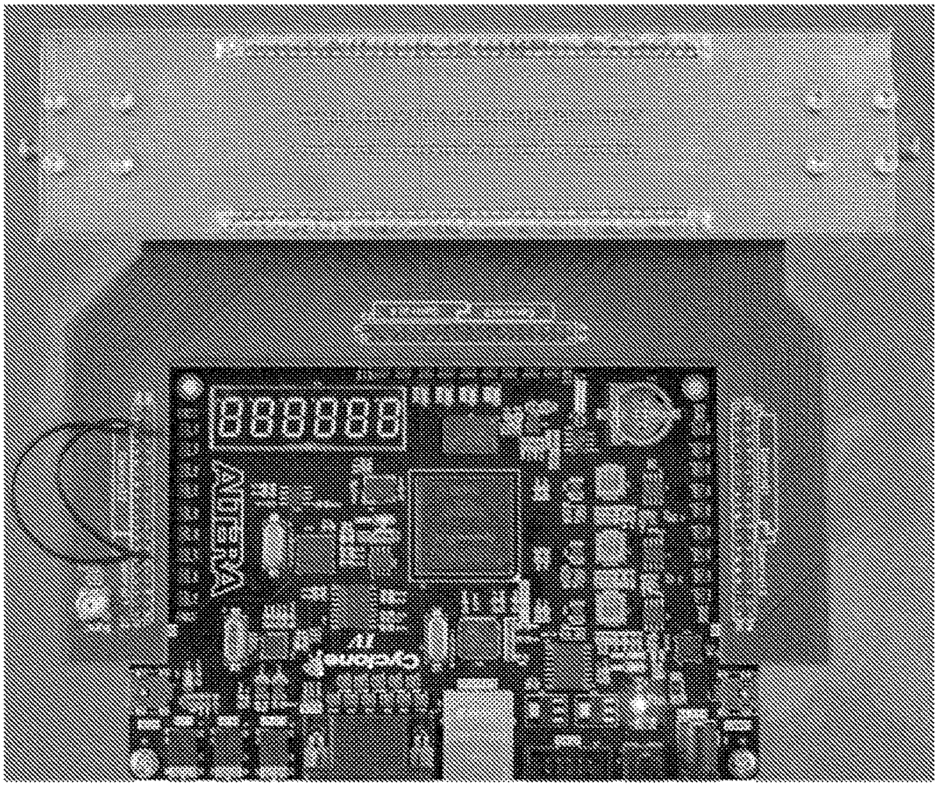

Prototype design. The STC metasurface antenna operates at microwave frequencies and adopts the SIW as the waveguide. As shown in FIGS. 9*a*-9*c*, the SIW uses upper and lower metal layers along with two rows of the metalized vias to form a rectangular dielectric waveguide. The coding meta-atom 26 consists of a rectangular loop slot etched on the top surface of the waveguide to couple energy from the waveguide into free space. Two switching elements, such as PIN diodes 30, 32 (for example, MACOM MADP-000907-14020x) biased in the same states are mounted across the gaps of the loop slot along the x-direction. When the two PIN diodes are OFF with a biasing voltage of 0 V, the slot meta-atom is in the coupling state (corresponding to the coding state of "1") to leak energy into free space. On the contrary, the element is in the non-coupling mode (corresponding to the state "0") as the PIN diodes are ON with a forward biasing voltage of 1.33 V. The switching capability of the meta-atom between the coupling and non-coupling states is enabled by the conductive and capacitive equivalence of the PIN diodes in the forward and non-bias states, respectively (See FIG. 8*a* for the equivalent circuits of the PIN diode in ON and OFF states). The metal vias 16 that exist in the SIW are leveraged to act as the common electrode for the biasing of the two PIN diodes such that the perturbation of the DC bias network on the guided wave can be minimized. The bias metal via passes from the edge of the slot meta-atom down through the substrate and is finally connected to an open-ended radial stub 19 configured to choke the RF leakage. The slot meta-atom is configured to weakly couple energy from the waveguide in the coupling state such that the meta-atoms do not seriously perturb the waveguide mode. More importantly, meta-atoms downstream can also get enough excitation to have a large radiating aperture of the metasurface. To this end, the geometry parameters of the loop slot are carefully tuned to be slightly off the resonance at the operating frequency, using the commercial software package, CST Studio Suite numerical simulator. The simulated radiation patterns of the meta-atom in the coupling and non-coupling states at 27 GHz are illustrated in FIG. 18*c*. The gain of the radiating meta-atom is 12.5 dB higher than that in the non-coupling state. Consequently, the radiating state of each meta-atom can be independently controlled by switching ON-OFF the embedded PIN diodes in a predetermined coding sequence. More simulated scattering parameters of the meta-atom in the coupling and non-coupling states are given in FIG. 8.

Figure 6C:
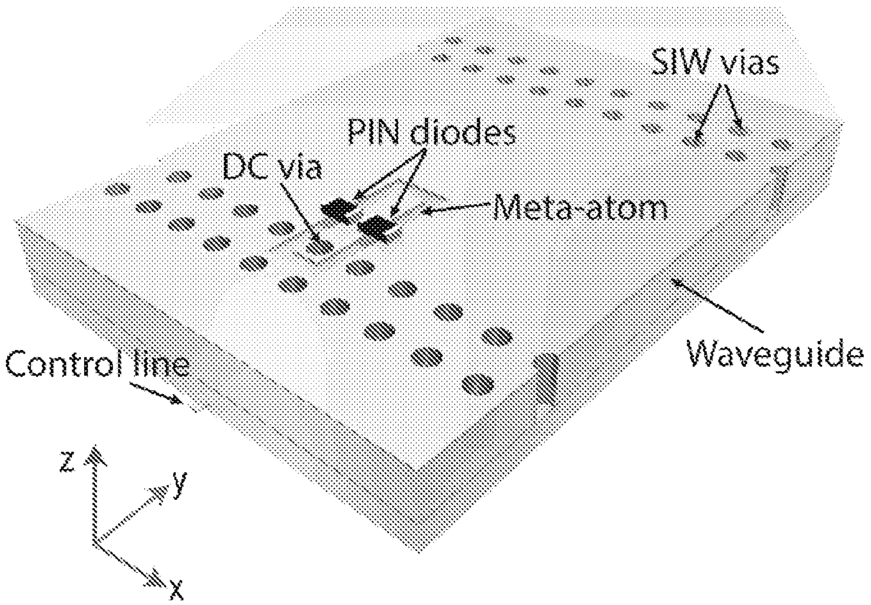

To reduce the period of the meta-atom, we use the staggered configuration in which the metasurface consists of two rows of staggered rectangular slots located on the top surface of the waveguide, as shown in the fabricated metasurface prototype in FIG. 6*c*. The period is p=1 mm along the x-axis, corresponding to $0.09\lambda_0$, where $\lambda_0$ is the free-space wavelength at 27 GHz. The metasurface antenna consists of 82 meta-atoms with an oversize of 11.4 mm×82 mm ($1.02\lambda_0 \times 7.38\lambda_0$). A low-cost FPGA control board (ALTERA Cyclone IV) is adopted to feed the dynamic voltage signals into the meta-atoms. A program recording the STC matrix is preloaded in the FPGA to generate 82 independent control signals. In the trial, the modulation frequency is $f_m$=20 kHz, corresponding to a modulation period T of 50 µs. The diodes' switching speed is set as 2 MHz, and the corresponding pulse width is 0.5 µs. Note that a higher modulation frequency and switching speed can be achieved with a high-performance FPGA.

Prototype simulation. To study the scattering and radiation characteristics of the meta-atom, we modeled and simulated a single slot opening fed by the SIW, as shown in FIG. 6*b*, using the commercially available CST Studio Suite numerical simulator. In the simulation, the PIN diode was modeled as a series of resistance R=8Ω and inductance L=30 pH for ON state, and a series of capacitance C=0.052 pF and inductance L=30 pH for OFF state, respectively, as shown FIG. 8*a*. Two wave ports are used to excite the fundamental $TE_{10}$ mode of the SIW and feed the loop meta-atom. The simulated S-parameters are shown in FIGS. 8*b*-8*d*.

Prototype fabrication. Two commercially available Taconic TLY substrates (relative dielectric constant $\varepsilon_r$=2.2, loss tangent tan δ=0.0009) with a thickness of 1.52 and 0.76 mm are used as the substrates of the SIW and DC bias network, respectively. The two TLY substrates are bonded by a Rogers RO4450F prepreg with a relative dielectric constant of 3.52, a loss tangent of 0.004, and a thickness of 0.101 mm. The SIW waveguide and slot opening were fabricated using a commercial Printed Circuit Broad (PCB) manufacturing process. After finished, the PIN diodes (MACOM MADP-000907-14020x) were added on the top of each loop slot by reflow soldering.

Figure 6D:
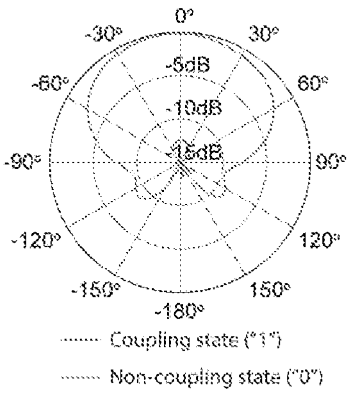
Figure 6E:
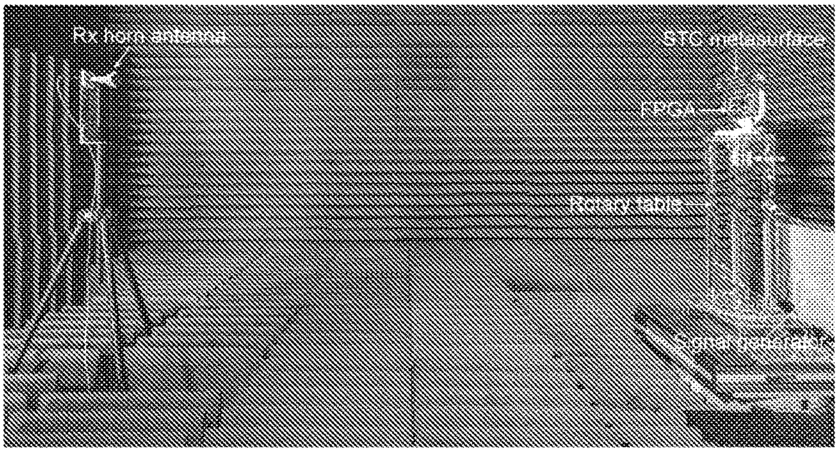

Prototype measurements. The fabricated metasurface was characterized inside a microwave anechoic chamber, as shown in FIG. 6*d*. A signal generator (Agilent E8267D) launches a monochromatic signal at 27 GHz and connects to Port 1 of the STC metasurface antenna. Port 2 of the metasurface antenna is connected to a matching load to absorb the residue power. A linearly polarized diagonal horn is employed as the receiving (Rx) antenna connected to a vector network analyzer (VNA-Agilent E8363C) to detect the harmonic signals generated by the STC metasurface. The transmitting and receiving antennas are aligned using lasers. The distance between the transmitting and receiving antennas is 2.5 m, satisfying the far-field condition of the STC metasurface antenna. A 3D printed fixture is fabricated to mount the STC metasurface and the FPGA control board on the computer-controlled rotary stage. Radiation pattern measurement of the STC metasurface antenna is carried out by automatically rotating the receiver mounted on a rotary stage in the horizontal plane with an angular step of 1°.

As used herein, terms "approximately", "basically", "substantially", and "about" are used for describing and explaining a small variation. When being used in combination with an event or circumstance, the term may refer to a case in which the event or circumstance occurs precisely, and a case in which the event or circumstance occurs approximately. As used herein with respect to a given value or range, the term "about" generally means in the range of ±10%, ±5%, ±1%, or ±0.5% of the given value or range. The range may be indicated herein as from one endpoint to another endpoint or between two endpoints. Unless otherwise specified, all the ranges disclosed in the present disclosure include endpoints. The term "substantially coplanar" may refer to two surfaces within a few micrometers (μm) positioned along the same plane, for example, within 10 μm, within 5 μm, within 1 μm, or within 0.5 μm located along the same plane. When reference is made to "substantially" the same numerical value or characteristic, the term may refer to a value within ±10%, ±5%, ±1%, or ±0.5% of the average of the values.

Several embodiments of the present disclosure and features of details are briefly described above. The embodiments described in the present disclosure may be easily used as a basis for designing or modifying other processes and structures for realizing the same or similar objectives and/or obtaining the same or similar advantages introduced in the embodiments of the present disclosure. Such equivalent construction does not depart from the spirit and scope of the present disclosure, and various variations, replacements, and modifications can be made without departing from the spirit and scope of the present disclosure.

The invention claimed is:

1. A self-filtering, space-time coding, waveguide-driven metasurface antenna comprising:

at least first and second metal layers;

a first dielectric layer interposed between the first and second metal layers;

a plurality of metal vias formed in the first dielectric layer;

a substrate integrated waveguide (SIW) formed from the first and second metal layers and from the metal vias in the first dielectric layer;

a plurality of meta-atoms formed in the first metal layer, each meta-atom including a slot cooperating with two switching elements for switching a meta-atom between an on and off state, wherein each meta-atom behaves as a magnetic dipole antenna element that radiates electromagnetic waves into free space such that propagating guided waves inside the substrate integrated waveguide are converted and molded into arbitrary selected out-of-plane free-space waves in both a frequency domain and a momentum domain.

2. The self-filtering, space-time coding, waveguide-driven metasurface antenna of claim 1, wherein the plurality of meta-atoms is formed in first and second rows.

3. The self-filtering, space-time coding, waveguide-driven metasurface antenna of claim 2, wherein a period for the first row of meta-atoms is offset from a period for the second row of meta-atoms.

4. The self-filtering, space-time coding, waveguide-driven metasurface antenna of claim 1, further comprising control lines.

5. The self-filtering, space-time coding, waveguide-driven metasurface antenna of claim 1, wherein the switching elements are PIN diodes.

6. The self-filtering, space-time coding, waveguide-driven metasurface antenna of claim 1, further comprising a controller to switch the switching elements between a coupling and a non-coupling state in a predetermined sequence to create the arbitrary free-space waves.

7. The self-filtering, space-time coding, waveguide-driven metasurface antenna of claim 6, wherein the controller is an FPGA.

8. The self-filtering, space-time coding, waveguide-driven metasurface antenna of claim 1, wherein unwanted higher-order harmonics cannot fulfill phase-matching conditions and are prohibited inside the SIW.

9. The self-filtering, space-time coding, waveguide-driven metasurface antenna of claim 1, wherein a radiating state of each meta-atom is configured to be independently controlled by switching the switching elements of each meta-atom in a predetermined coding sequence.

10. The self-filtering, space-time coding, waveguide-driven metasurface antenna of claim 9, further comprising a processor to supply the predetermined coding sequence.

* * * * *